United States Patent [19]
Jones et al.

[11] Patent Number: 5,301,010
[45] Date of Patent: Apr. 5, 1994

[54] INTERFEROMETER HAVING A SHORT COHERENCE LENGTH LIGHT SOURCE AND MEANS FOR IDENTIFYING INTERFERENCE FRINGES

[75] Inventors: Robert Jones; Robert J. Welford; Michael S. Hazell, all of Cambridge, United Kingdom

[73] Assignee: Cambridge Consultants Limited, United Kingdom

[21] Appl. No.: 752,612

[22] PCT Filed: Feb. 19, 1989

[86] PCT No.: PCT/GB90/00267
§ 371 Date: Sep. 23, 1991
§ 102(e) Date: Sep. 23, 1991

[87] PCT Pub. No.: WO90/09557
PCT Pub. Date: Aug. 23, 1990

[30] Foreign Application Priority Data
Feb. 18, 1989 [GB] United Kingdom ............... 8903725

[51] Int. Cl.⁵ .................................. G01D 9/02
[52] U.S. Cl. ......................... 356/358; 356/345
[58] Field of Search ............... 356/345, 349, 358, 356

[56] References Cited

U.S. PATENT DOCUMENTS 4,596,466  6/1986  Ulrich .................................. 356/345
4,636,076  1/1987  Pettigrew ........................... 356/356
5,037,206  8/1991  Etzkorn et al. ..................... 356/356

FOREIGN PATENT DOCUMENTS 1937355  1/1970  Fed. Rep. of Germany.
3623265  1/1988  Fed. Rep. of Germany.

OTHER PUBLICATIONS

Conference Proceedings OFS 1984, 2nd International Conference on Optical Fiber Sensors, Sep. 5–7, 1984, Stuttgart, VDE-Verglag GmbH, "High-Accuracy Position-Sensing with Fibert-Coupled White–Light Interferometers".

Primary Examiner—Samuel A. Turner
Attorney, Agent, or Firm—Lerner, David, Littenberg, Krumholz & Mentlik

[57] ABSTRACT

An interferometer utilises a short coherence length light source in such a way that the visibility of fringes produced varies as a function of the measurand. In order to provide a signal which represents the value of the measurand, the visibility of the fringes is calculated.

30 Claims, 17 Drawing Sheets

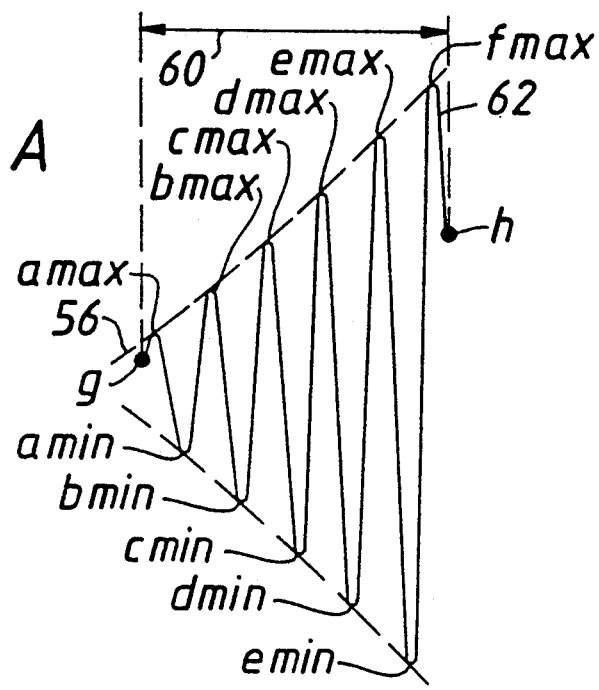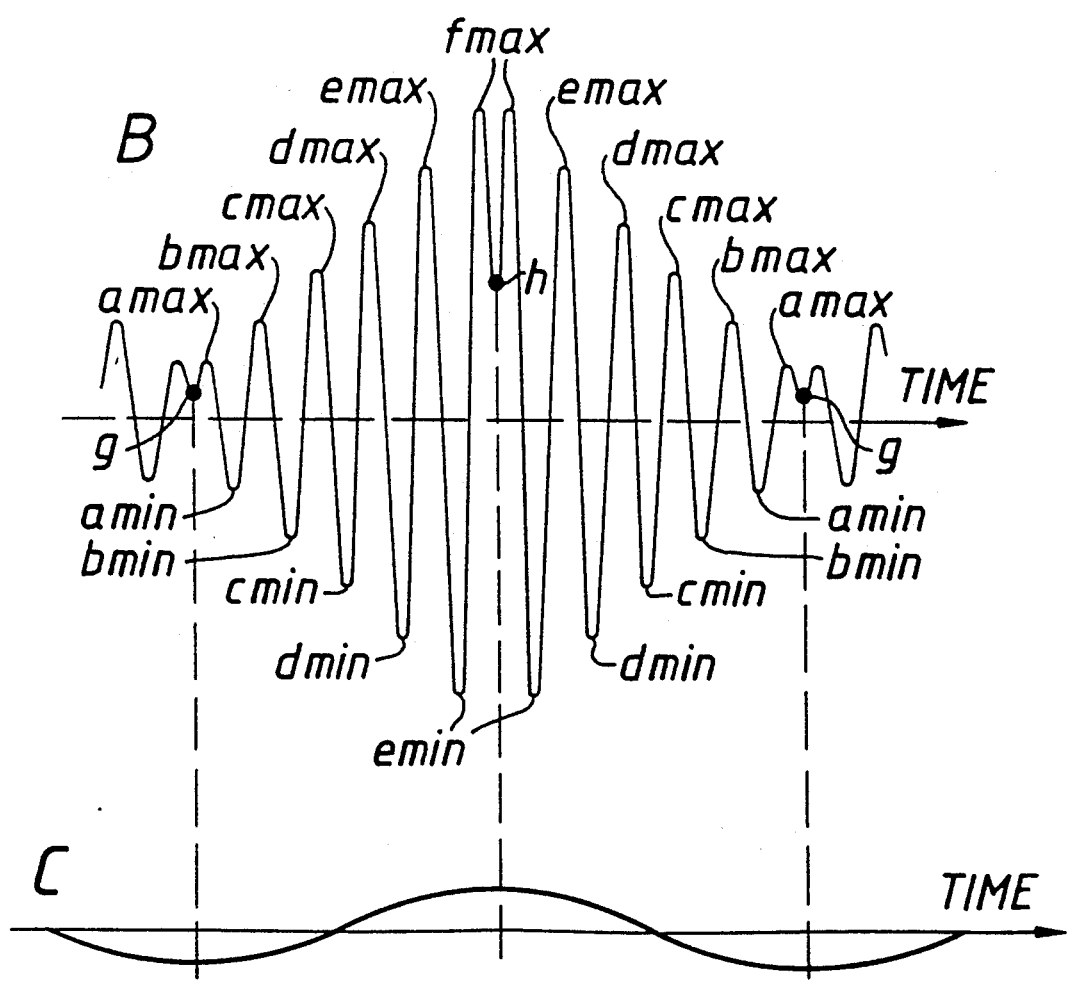
FIG. 5.

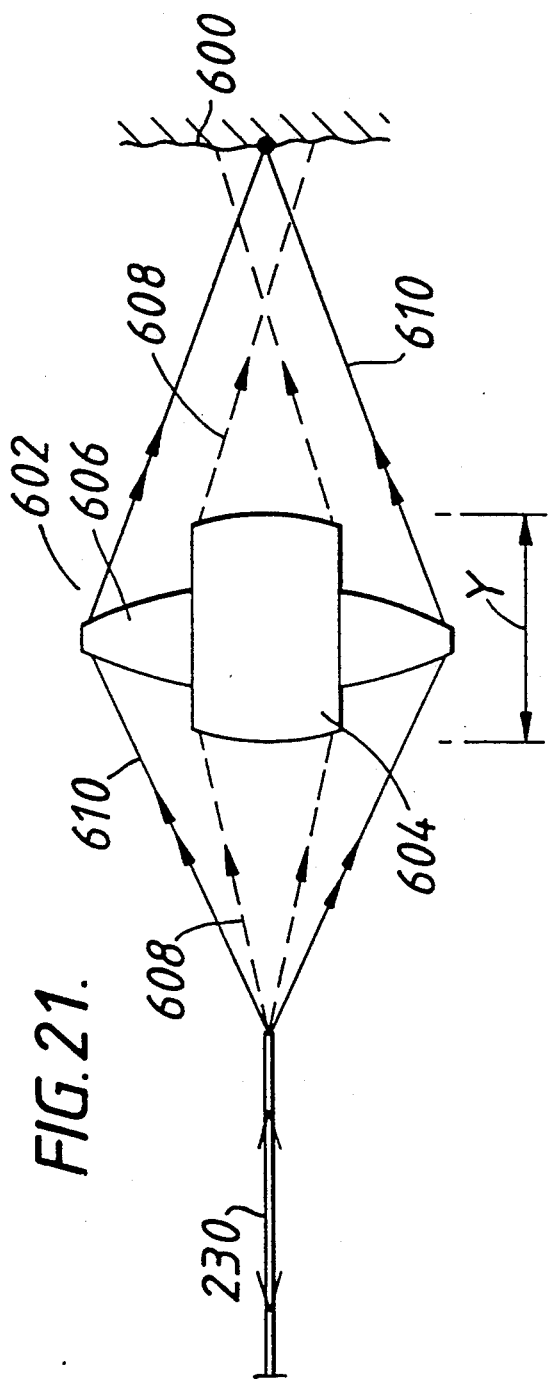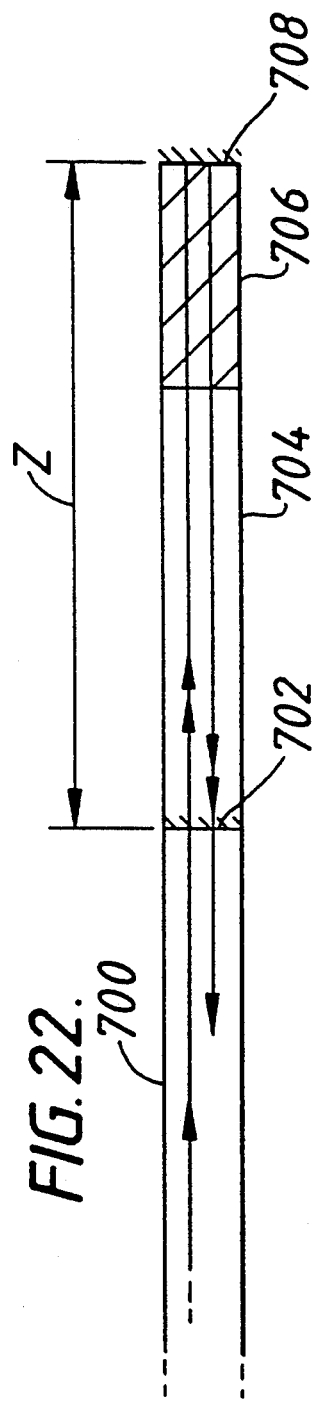
FIG.21.
FIG.22.

INTERFEROMETER HAVING A SHORT COHERENCE LENGTH LIGHT SOURCE AND MEANS FOR IDENTIFYING INTERFERENCE FRINGES

This invention relates to interferometry and is particularly concerned with methods and apparatus for measuring or tracking variations in a parameter utilising interferometric techniques.

In conventional interferometers, light from a monochromatic coherence source is passed through a beam splitter that divides the light into two beams which, after reflection, are both returned to the beam splitter and recombined. Upon recombination, destructive or constructive interference arises dependent upon any optical path length differences in the two arms. Thus, if each arm includes a mirror for reflecting the split beam back to the beam splitter, movement of one of the mirrors towards (or away) from the beam splitter will cause destructive and constructive interference alternately to arise, so that an observer of the recombined beam would alternately see bright and dark fringes as the mirror is moved. In a conventional interferometer, counting of such fringes enables the distance through which the mirror has been moved to be measured and thus, causing the mirror to move as a function of the parameter to be measured, enables changes in that parameter to be measured.

If the range of movement of the movable mirror represents the range of values of the parameter which can be measured, it is necessary, if an absolute value for the parameter is required, to ensure that the mirror is first moved to one of its end positions and then to count fringes from that position, when setting up the apparatus. This is a disadvantage of conventional interferometers.

In a conventional interferometer as described above, the intensities of the bright and dark fringes, and therefore the contrast between those fringes, remains substantially uniform as the movable mirror moves. If a light source having a certain but limited bandwidth were used instead of the monochromatic light source, the brightness of both the bright and dark fringes and the contrast between them would all vary as the movable mirror moves. The contrast would be a maximum when the optical path length difference in the two arms of the interferometer is zero and would decrease with increasing optical path length difference (or phase difference) in the two arms. Also, the brightness of the bright fringes and the darkness of the dark fringes would be at a maximum when the optical path length difference in the two arms is at or near to zero. After the optical path length difference has increased beyond a certain point dependent upon the bandwidth of the light source, the contrast between the bright and dark fringes would have decreased to an extent that the fringes become substantially invisible.

The above described phenomenon is known and light sources of limited bandwidth whereby this phenomenon may be produced are said to have a short coherence length. Proposals have been made in the prior art, for example in U.S. Pat. Nos. 4,596,466 and 4,697,926 to provide an interferometer utilising a light source of short coherence length, instead of a monochromatic source. In the prior art proposals, the interferometer operates by causing the movable mirror to be continuously moved between two end positions representing the range of the parameter which can be measured, detecting the fringes as the mirror moves and determining the mirror position at which the contrast of the fringes is maximum. These proposals suffer from the disadvantage that, for each measurement, the movable mirror has to be moved throughout its range of movement, thus limiting the bandwidth or frequency of measurement which can be taken. Further, measurements are made relative to a mechanical or piezoelectric scan motion whose characteristics have to be calibrated in order to provide an accurate output measurement.

One object of the invention is to overcome these problems.

In one aspect, the invention provides an interferometer and a method of interferometry in which a light source of relatively short coherence length is utilised to produce interference fringes having a parameter whose magnitude varies as a function of the variable to be measured, the magnitude of said parameter is detected, and a signal is derived from said magnitude to represent the value of the variable.

In a further aspect, the invention provides an interferometer or method of interferometry in which a relatively short coherence length light source is utilised to produce fringes having a contrast which varies as a function of the measurand and the signal representing said measurand is derived from said contrast.

In another aspect, the invention provides an interferometer and a method of interferometry in which a set of interference fringes is produced in sequence as the measurand varies, the fringes in said set are distinguishable from each other and the particular fringe or fringes of the set are detected to provide an indication of the magnitude of the measurand.

An alternative aspect of the invention concerns the problem that in certain applications it would be desirable to be able to make interferometric measurements in a hostile environment. With a view to solving this problem, a further aspect of the invention provides a measuring apparatus comprising an interferometric sensing head, a tracking interferometer and linkage means interconnecting said sensing head and said tracking interferometer for transmitting light from the sensing head to the tracking interferometer for the taking of interferometric measurements. With this apparatus, the sensing head may be constructed as a robust unit in order to withstand hostile environments.

The invention is described further with reference to the accompanying drawings, in which:

FIGS. 5 (a–c) are a waveform diagram for understanding the operation of the embodiment of FIG. 3;

FIGS. 16 to 22 are diagrams of sensing heads which may be incorporated into the embodiment of FIG. 10.

Figure 1:
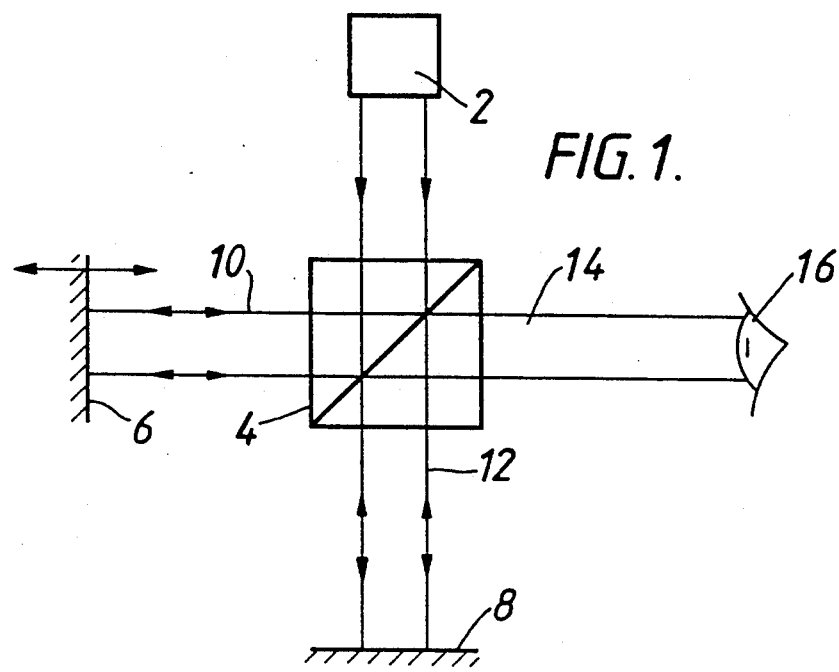
FIG. 1 is a diagram of a simple interferometer and is included to assist in understanding the optical principles utilised in the preferred embodiment of the present invention.

FIG. 1 shows a simple interferometer comprising a light source 2, a beam splitter 4 and two plane mirrors 6,8 which are arranged to reflect the split beams of light 10,12 back to the beam splitter 4 for recombination in a beam 14 which is directed to a detector or observer 16.

If the light source 2 is monochromatic and coherent and the optical path lengths between the mirrors 6,8 and the beam splitter 4 respectively are equal, the beams 10 and 12 will constructively interfere on recombination and the detector or observer 16 will receive bright light in the beam 14. If one of the mirrors, say mirror 6, is moved away from the beam splitter 4, alternate destructive and constructive interference will arise upon recombination of the beams 10 and 12, assuming the movement is greater than the wavelength of light concerned, and the intensity of the light in the beam will alternate between high and low levels. Thus, the observer or detector 16 would alternately see a bright fringe followed by a dark fringe followed by a bright fringe etc. Where the light from source 2 is monochromatic, the intensity of the bright and dark fringes and the contrast between these fringes will be substantially constant as the mirror 6 moves regardless of which direction it moves in and substantially regardless of the distance through which it is moved. Whilst counting these fringes would provide a measure of the distance through which the mirror has moved, without knowledge of the starting point it would not provide an indication of the actual position of the mirror.

If the light source 2 were to produce white light, substantially no fringes would be observed as the mirror 6 were moved although, when the mirrors 6 and 8 were positioned at equal distances from the beam splitter 4, constructive interference would cause the brightness of the beam 14 to increase compared to the brightness when the distances differ. However, there would be no succession of fringes which could be counted to obtain a measure of the distance through which the mirror has moved.

Figure 2:
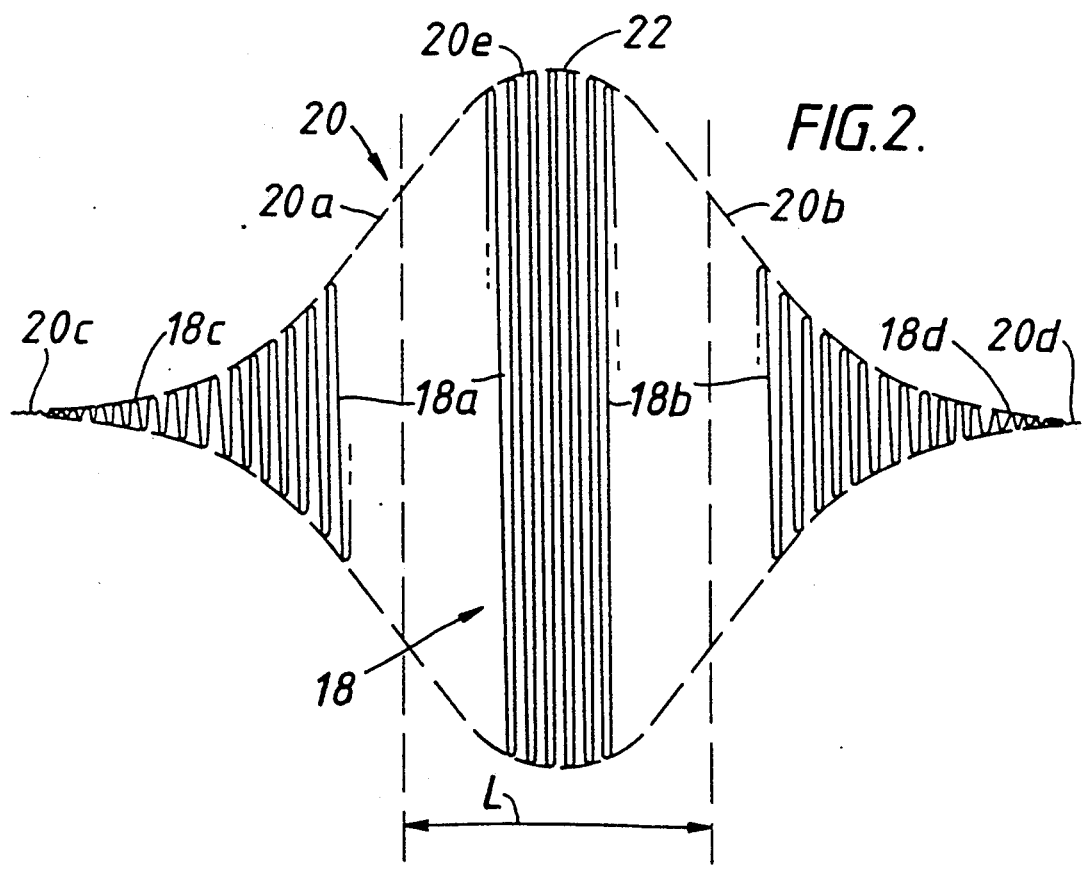
FIG. 2 is a diagram, not to scale, illustrating variations in light intensity which arise in a beam produced by the interferometer of FIG. 1 under certain conditions.

If, however, the light source 2 were quasi-monochromatic, that is to say non-monochromatic but of limited bandwidth, whilst fringes would be produced, these would be of varying intensity and contrast. More particularly, a fringe of maximum brightness would be observed when the mirrors 6 and 8 are equidistant from the beam splitter 4 and a series of fringes of successively lower contrast would be observed as the distance through which the mirror 6 increases until, at some point dependent upon the bandwidth of the light, the contrast between the bright and dark fringes would become so low that the fringes would cease to be observable. This is illustrated in FIG. 2 in which curve 18 (which for clarity is only partly shown) represents the intensity of the light in beam 14 against the position of the mirror 6 when moved through a distance L and curve 20 is the envelope of the maxima in curve 18. When the mirror 6 is in its centre position and the distance between mirrors 6 and 8 and the beam splitter 4 respectively is equal, constructive interference takes place producing a fringe of peak intensity as indicated at 22. As mirror 6 moves to the left, the intensity of the light in beam 14 alternately decreases and increases as shown by portion 18a of curve 18 and the amplitude of these variations in intensity decreases as the distance through which the mirror 6 has been moved increases. Thus a series of successive fringes is produced. Similarly, portion 18b of curve 18 illustrates the same effect if the mirror 6 were moved to the right from its centre position as shown in FIG. 1. As will be appreciated from consideration of curve 18, the intensity of the bright fringes as indicated by the maxima in the curve 18 decreases with increase in the distance through which the mirror 6 has moved from its centre position and simultaneously the intensity of the dark fringes, represented by the minima of curve 18, increases. Thus, the contrast between the bright and dark fringes as represented by the amplitude of curve 18 decreases with increase in the distance through which the mirror 6 has moved from its centre position until as illustrated by portions 18c and 18d of curve 18 the amplitude of that curve becomes quite small and continued movement of the mirror no longer produces fringes which are easily observable. In other words, at this time, the intensity of the beam 14 hardly varies as the mirror continues to move. Curve 20 in FIG. 2 thus comprises relatively steep portions 20a,20b, relatively flat outer portions 20c and 20d and a peak 20e. As will be appreciated from the above, the contrast of the fringes represented in FIG. 2 is representative of the path difference between mirrors 6 and 8 respectively and the beam splitter 4 and this fact is utilised in the preferred embodiment of the invention for obtaining an indication of the actual value of this path difference.

Figure 3:
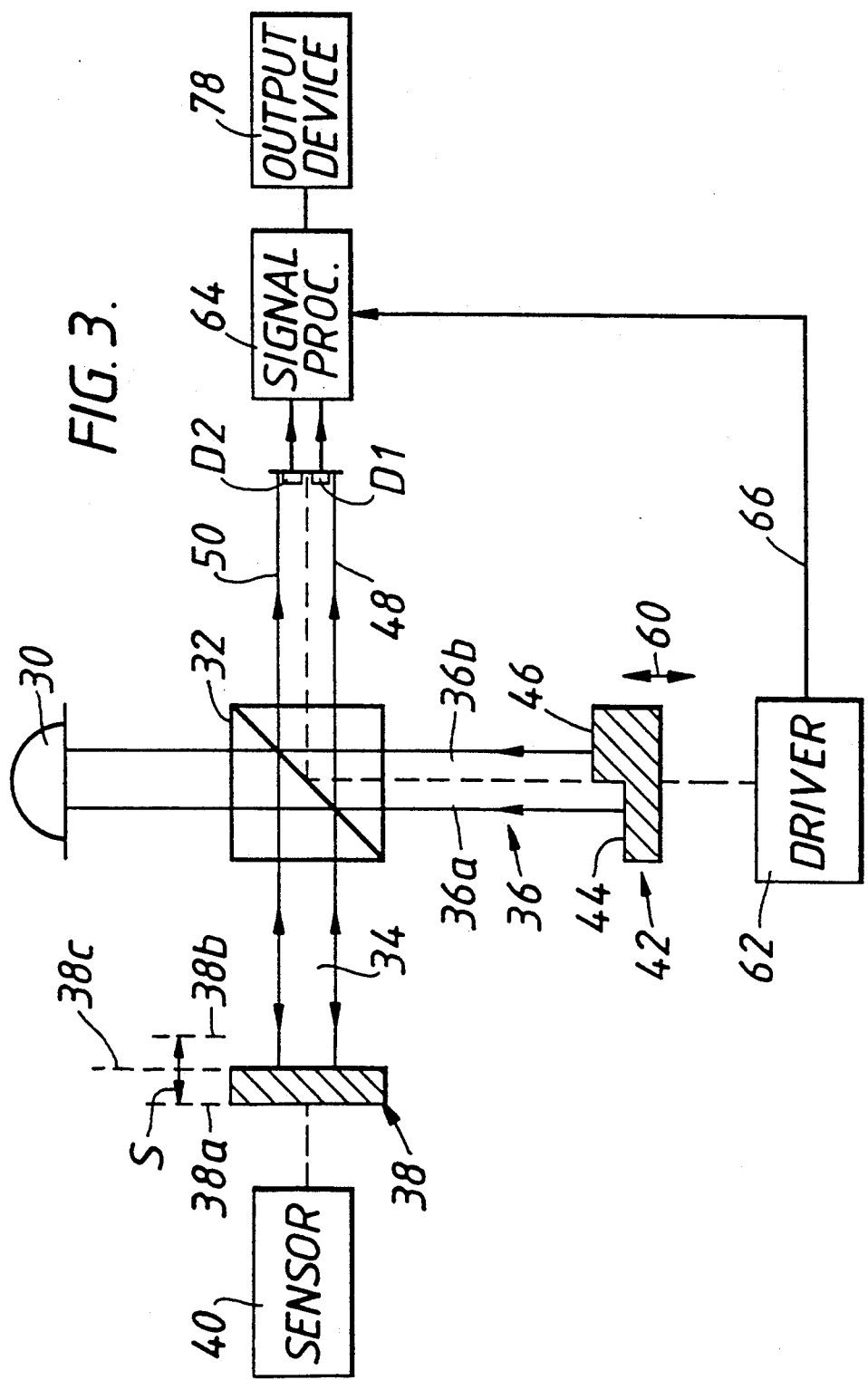
FIG. 3 is a diagram of a first preferred embodiment of the invention.

In the embodiment of the invention shown in FIG. 3, a light source 30, such as a laser diode, directs non-monochromatic light of limited bandwidth of a beam splitter 32 which splits this light into first and second beams 34,36. A plane mirror 38 reflects the beam 34 back to the beam splitter 32 and is coupled to a sensor 40 for sensing a parameter to be measured. As the parameter varies, the sensor causes mirror 38 to move towards or away from the beam splitter 32. The type of sensor and the means by which this movement is achieved are not described as they form no part of the present invention.

The beam 36 is reflected back to the beam splitter 32 by a mirror 42 which is stepped to provide reflective surfaces 44 and 46 at different distances from the beam splitter 32. Thus, after reflection, the beam 36 comprises two parts, indicated as 36a and 36b which have different phases as a result of having been reflected from the spaced surfaces 44 and 46.

Recombination of the beam parts 36a and 36b with the beam 34 at the beam splitter 32 produces two output beams 48 and 50 respectively. Light sensitive detectors D1 and D2 receive the respective beams 48 and 50.

Figure 4:
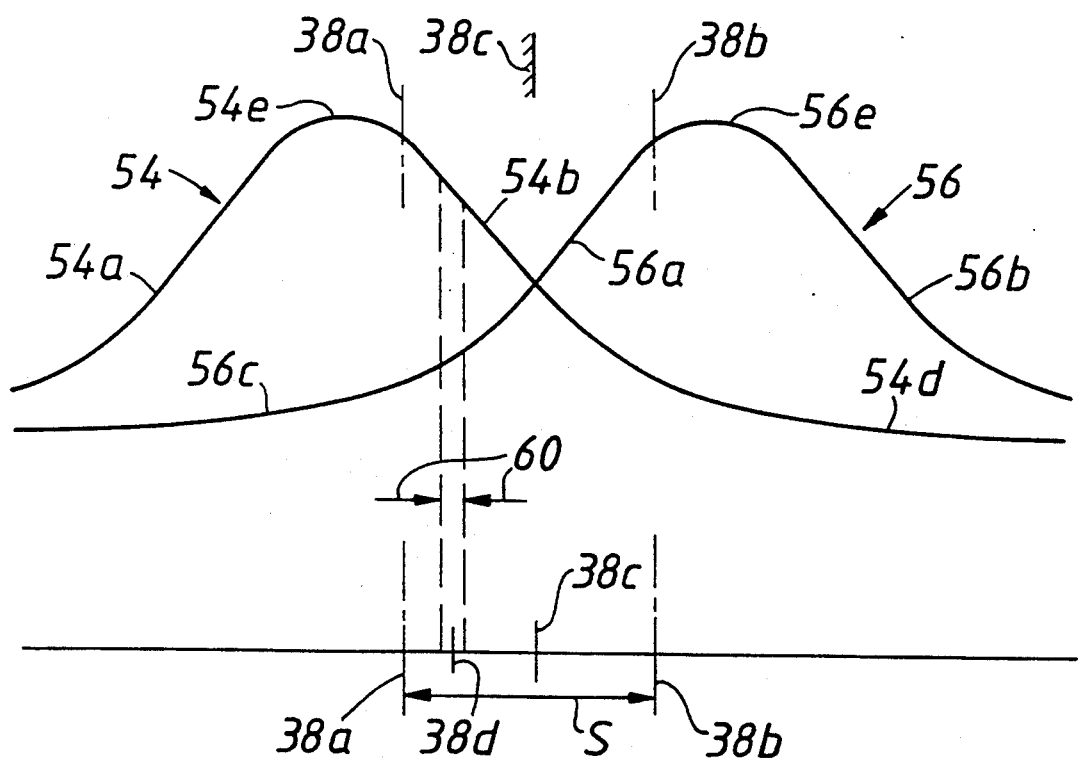
FIG. 4 is a graph to illustrate the operation of the apparatus of FIG. 3.

Mirrors 38 and 42 are arranged so that, as mirror 38 moves towards and away from beam splitter 32, interference fringes of varying contrast as described with reference to FIG. 2 are produced both in beam 48 and in beam 50. In FIG. 4, curve 54 is the envelope of the intensity maxima of the fringes produced in beam 50 and curve 56 is the envelope of the maxima of the fringes produced in beam 48, curves 54 and 56 each corresponding to curve 20 of FIG. 2. Curves 54 and 56 are displaced relative to each other as a result of the presence of the step in mirror 42. This step height h is chosen so that, although curves 54 and 56 are displaced relative to each other, they overlap in the manner shown. As with the curve 20 in FIG. 2, curves 54 and 56 in FIG. 4 comprise steep and relatively linear portions 54a,54b and 56a,56b, relatively flat portions 54d and 54c (the other relatively flat portions not being visible in FIG. 4) and peaks 54e and 56e.

The sensor 40 is arranged so that variation of the parameter sensed throughout the range to be measured causes movement of the mirror 38 through a distance S between end positions 38a and 38b as indicated in FIG. 3. As shown in FIG. 4, the distance S and end positions 38a and 38b are chosen to correspond to the overlapping relatively linear steep portions 54b,56a of the envelope curves 54 and 56. To assist in relating FIG. 4 to FIG. 3, the centre position 38c of the mirror 38 is also indicated in both Figures.

From a consideration of FIGS. 2, 3 and 4 and the above description, it will be appreciated that as the mirror 38 moves from position 38a to 38b the intensity of the bright fringes detected by detector D2 and the contrast between the bright and dark fringes decreases and the intensity and contrast of those detected by detector D1 increases. Thus, the position of the mirror 38a can be determined by determining the contrast of these fringes.

To make this determination, the mirror 42 is oscillated towards and away from the beam splitter 32 as indicated by double-headed arrow 60 in FIG. 3. The amplitude of the oscillation is equal to a few wavelengths of the light emitted by diode 30 (or more accurately a few wavelengths of the light at the centre of the band emitted by laser diode 30) so as to introduce an oscillating phase variation between both beam part 36a and beam 34 and beam part 36b and beam 34. The oscillation of mirror 42 thus causes the intensity of each beam 48 and 50 to vary as constructive and destructive interference successively takes place, i.e. as bright and dark fringes successively appear. As a result, detectors D1 and D2 will produce outputs with an alternating component whose amplitude is dependent upon the contrast in brightness between the bright and dark fringes. By way of example, if it is assumed that the mirror 38 is in a position 38d as shown in FIG. 4 then the amplitudes of the signals output by detectors D1 and D2 will be respectively large and small and each output will be amplitude modulated in accordance with the corresponding portion of the respective envelope curve 54 or 56. This can be better understood by consideration of FIG. 5 in which diagram A (the upper diagram) shows a portion of the curve 56 in the region of position 38d and also includes a curve 62 representing the intensity variation (i.e. the fringes) arising in beam 48 as the mirror 42 oscillates. To assist in relating FIG. 4 and FIG. 5 to FIG. 3, the double-headed arrow 60 is marked on FIG. 4 and FIG. 5 to represent the oscillation. Thus, the horizontal axis of the upper diagram (diagram A) in FIG. 5 represents the instantaneous position of the mirror 42 as it oscillates and curve 62 is a plot of the intensity of beam 48 against the position of the mirror 42.

Diagram B in FIG. 5 is a plot of the magnitude of the output signal from detector D1 against time and diagram C in FIG. 5 is a plot of the position of oscillating mirror 42 against time. As can be seen from diagram A, the amplitude of oscillation of mirror 42 is such that, in each cycle, six fringes appear sequentially in each cycle. The maximum intensities of these six fringes are indicated as amax to fmax respectively and the minimum intensities of these fringes are designated as amin to emin (fmin being out of the range of oscillation of mirror 42). As can be seen in FIG. 5A, the end points of the oscillation of the mirror 42 in the example under discussion coincide with positions somewhat to the left of amax and somewhat to the right of fmax respectively, these positions being designated by reference characters g and h respectively in FIG. 5A.

The magnitude of the signal output by detector D1 is shown in FIG. 5B. As can be seen, as the mirror 42 is scanned backwards and forwards in the direction of arrow 60, the signal output by detector D1 varies according to the intensity of the light in beam 48 and the oscillating signal component from detector D1 has peaks corresponding to amax to fmax, troughs corresponding to amin to emin and intermediate values corresponding to points g and h shown in FIG. 5A, these values g and h appearing in signal B at times corresponding to the respective end positions of the oscillation of mirror 42 as illustrated by the curve in FIG. 5C.

Although not illustrated, a similar set of curves to those shown in FIG. 5 could be drawn for beam 50 and detector D2 but, in the example under discussion in which mirror 38 is at position 38d, the amplitude of the varying component of the signal from detector D2 would be much greater than that from detector D1 and the amplitude modulation of this varying signal would be out of phase with the modulation shown in FIG. 5B and would follow the slope of curve 54 at position 38d, as will be appreciated from consideration of FIG. 4.

Figure 6:
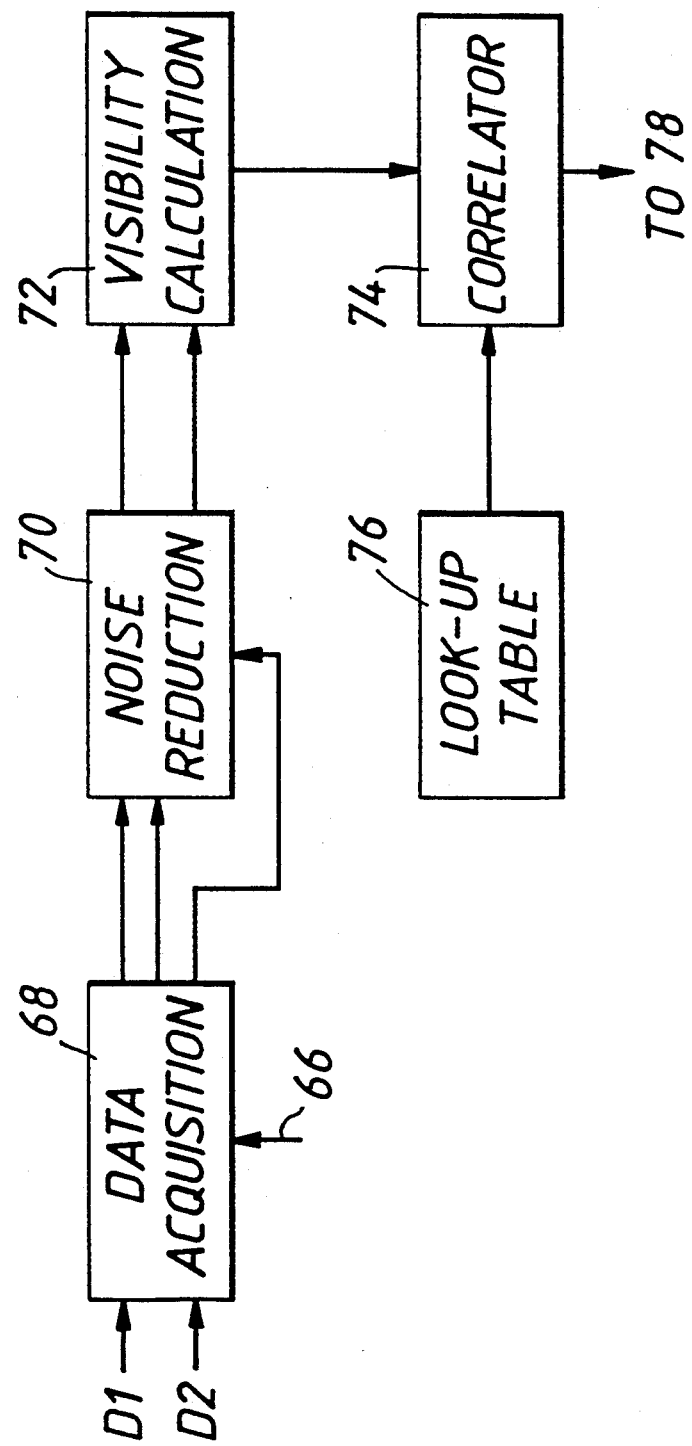
FIG. 6 is a block diagram showing part of the embodiment of FIG. 3 in more detail.

With reference again to FIG. 3, a driver 62, for example a piezoelectric crystal device actuated by an alternating voltage, is coupled to the mirror 42 to effect the oscillation 60. A signal processor 64, which may for example comprise a computer suitably programmed, receives the outputs from the detectors D1 and D2 and also receives on line 66 a signal from driver 62 which corresponds to waveform C in FIG. 5 and represents the oscillation of mirror 42. As seen in FIG. 6, which schematically represents the signal processor 64, the signals from the detectors D1 and D2 and the driver 62 are supplied to a data acquisition block 68 and, in this block, the signals may be digitised over a number of cycles of oscillation of the mirror 42, for example several tens or several hundreds of cycles, and the digitised signals stored for further processing.

In block 70, noise reduction is performed on the stored signals obtained in data acquisition block 68. This noise reduction is preferably achieved by the following routine:

1. Obtain all stored values of amax derived from detector D1 and compute and store average.
2. Repeat 1 for values of amin derived from detector D1.

3. Repeat 1 and 2 for each of bmax,bmin,cmax etc. for all other peaks and troughs derived from detector D1.
4. Repeat 1 to 3 for corresponding values derived from detector D2.

These averaged values of amax,amin etc. for both detectors are then utilised in block 72 for calculating the visibility of the fringes. This calculation may be performed as follows:

For detector D1:

$$F1 = (a\text{max} - a\text{min})/(a\text{max} + a\text{min})$$
$$F2 = (b\text{max} - a\text{min})/(b\text{max} + a\text{min})$$
$$F3 = (b\text{max} - b\text{min})/(b\text{max} + b\text{min})$$
$$F4 = (c\text{max} - b\text{min})/(c\text{max} + b\text{min})$$
$$\ldots$$
$$Fn = (f\text{max} - e\text{min})/(f\text{max} + e\text{min})$$

For detector D2:

$$G1 = (a'\text{max} - a'\text{min})/(a'\text{max} + a'\text{min})$$
$$G2 = (b'\text{max} - a'\text{min})/(b'\text{max} + a'\text{min})$$
$$G3 = (b'\text{max} - b'\text{min})/(b'\text{max} + b'\text{min})$$
$$\ldots$$
$$Gn = (f'\text{max} - e'\text{min})/(f'\text{max} + e'\text{min})$$

In the above calculation for detector D2, the prime (') has been added to indicate that it is the values obtained from detector D2 which are used. Of course, it will be appreciated from the aforegoing description that in calculation of the values F1 to Fn and G1 to Gn the averaged values derived in block 70 are utilised.

The values F1 to Fn and G1 to Gn represent the visibility of the fringes observed by detectors D1 and D2 as the mirror 42 oscillates and may be termed "visibility functions". In order to eliminate the effects of any variation in the intensity of the light output by laser diode 30 and reduce to a minimum the effects of component tolerance on relative power changes in the interferring beams, the following calculations are then performed in block 72:

$$H1 = F1/G1$$
$$H2 = F2/G2$$
$$H3 = F3/G3$$
$$\ldots$$
$$Hn = Fn/Gn.$$

H1 to Hn is a set of numbers which uniquely defines each of the possible positions of mirror 38 within its range of operation. The numbers H1 to Hn obtained in block 72 are then correlated in block 74 with a single set of numbers representing all positions of the mirror 38 within the range S. The numbers of the look-up table may be derived in a setting up operation when the instrument is prepared for use. This operation may comprise driving the mirror 38 between its end positions by activating the sensor 4. The detectors D1 and D2 would then (with the source 30 energised of course) produce sets of signals representing the brightness of the fringes as a function of the displacement throughout the range S. Preferably, the mirror 38 would be moved between its end positions and samples obtained a large number of times in order that noise reduction may be performed on the signals obtained. Visibility calculations would then be performed on the two sets of noise reduced signals in the manner described above with reference to block 72 except that, in the setting up operation, visibility calculations for all of the fringes within the range S would be produced. The individual visibility functions obtained for detector D1 would then be divided by the corresponding individual visibility functions obtained from detector D2 and the resulting ratios stored in the look-up table for correlation with H1 to Hn when the instrument is operated. This correlation may be achieved by comparing the numbers H1 to Hn with each successive group of n numbers in the look-up table to determine the best match. The number of comparisons performed to obtain the best match would then be an indication of the actual position of mirror 38 within its range S and this last-mentioned number may then be output to the output device 78 diagrammatically illustrated in FIG. 3, which device may for example be a printer or display or may alternatively simply be circuitry connected to some other electronic device which utilises the information obtained on the value of the parameter being sensed.

As an alternative to calculating the numbers H1 to Hn the numbers H'1 to H'n could be calculated as follows:

$$H'1 = (F1 - G1)/(F1 + G1)$$
$$H'2 = (F2 - G2)/(F2 + G2)$$
$$\ldots$$
$$H'n = (Fn - Gn)/(Fn + Gn)$$

A corresponding set of numbers indicating half-wavelength displacement in the range S would, of course, be stored in the look-up table for comparison with the numbers obtained during the measurement operation.

Where the numbers H'1 to H'n are used, the system would be highly tolerant to degradation and imperfections and would be particularly insensitive to, for example, variations in the power of the light source. This is because not only are the visibility functions F1 to Fn and G1 to Gn normalised but also further normalisation takes place in the calculation of H'1 to H'n.

The resolution of the device as so far described with reference to FIGS. 3 to 6 is limited to one-half wavelength. Higher resolution may be achieved utilising the modification shown in FIG. 7 in which the same reference numbers as used in FIGS. 3 and 6 are used to designate corresponding parts. As can be seen, FIG. 7 differs from FIG. 6 in that block 80 for sub-wavelength estimation is included and the output of this block is added to the output of correlator 74 in block 82, whose output is supplied to output device 78. As will be appreciated from FIG. 5, if mirror 38 moves slightly to the left of position 38d in the example illustrated, value g will decrease and value h will increase. Similarly, if mirror 38 were moved slightly to the right of position 38d, value g would increase and value h would decrease. In other words, as mirror 38 moves the phase relationship between curves B and C in FIG. 5 changes and the phase x of the mid-point 38d of the mirror oscillation can be calculated to a sub-wavelength resolution from the mean values g and h in addition to the other phase and amplitude data. This may be achieved, by way of example, as follows:

$$x = 1/2 \left\{ \sin^{-1} \left[ 2 \frac{(g - a\text{min})}{(a\text{max} - a\text{min})} - 1 \right] \div \right.$$

$$\sin^{-1}\left[2\frac{(h - e\min)}{(f\max - e\min)} - 1\right] - 4\pi n\Bigg)$$

where it will be recognised that h, g, amin, amax, emin, fmax derive from the fringe geometry at the points of turn round in the phase modulation (as illustrated in FIG. 5) and n corresponds to the fringe order derived from the coherence function measurement and correlation process defined by either H1 to Hn or H'1 to H'n.

Figure 7:
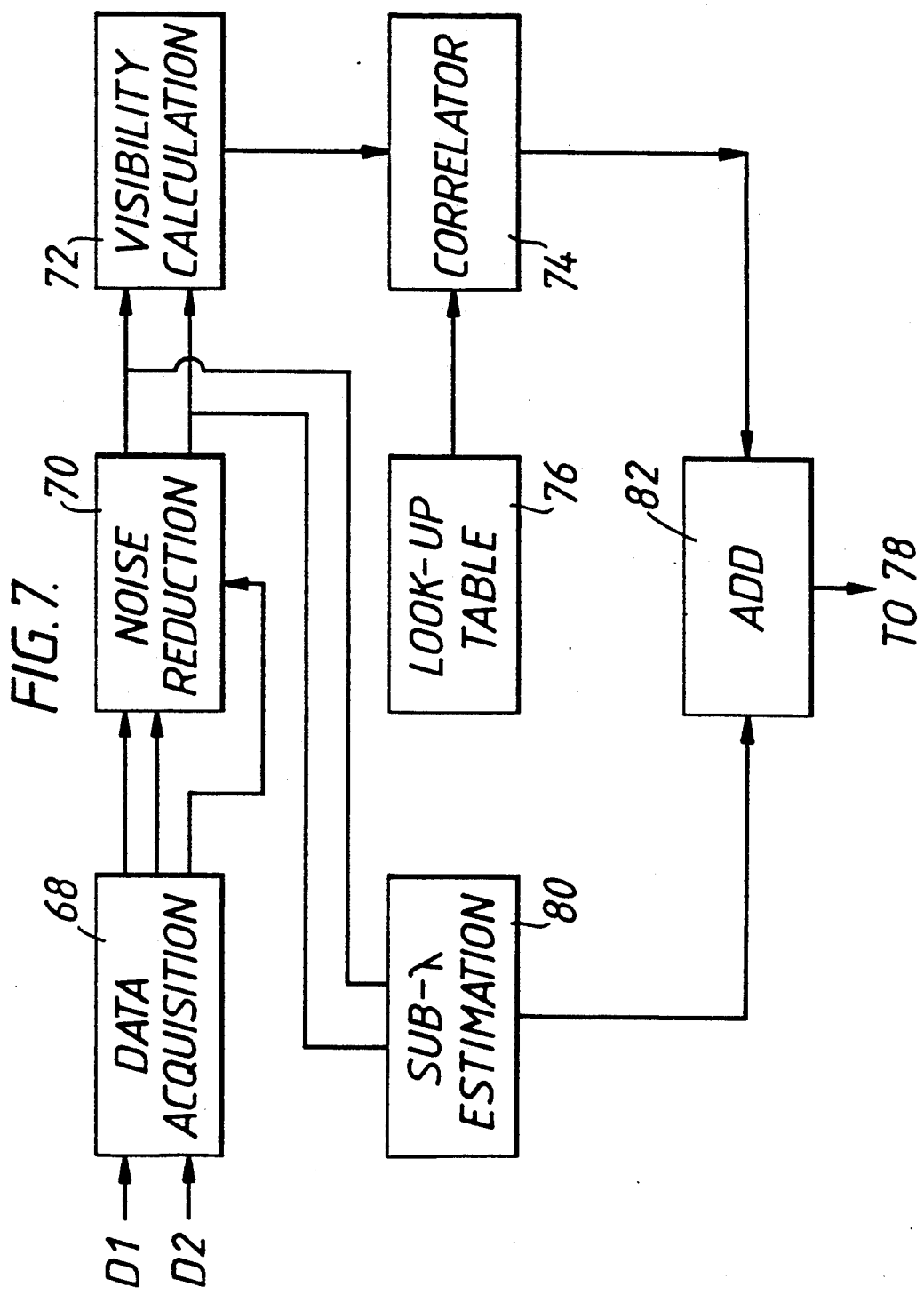
FIG. 7 is a block diagram showing a modification to the embodiment of FIG. 3 to obtain higher resolution.
Figure 8:
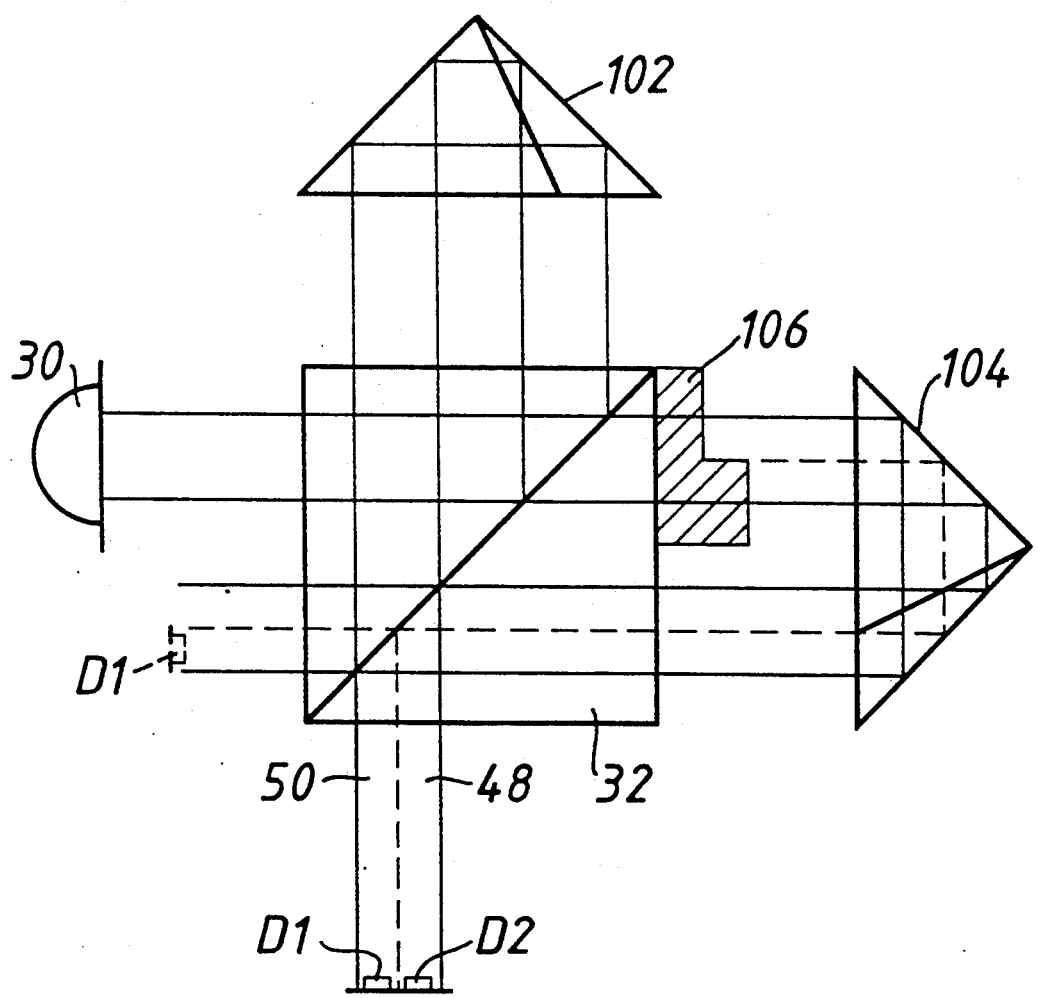
FIG. 8 is a diagram of another embodiment of the invention.

FIG. 8 shows part of a further modified embodiment which comprises only two detectors D1 and D2 and in which signal processing may be as described with reference to FIGS. 3 to 7. The mirrors 38 and 42 are dispensed with and replaced by corner cubes 102 and 104, one of which is connected to a sensor (not shown) and the other of which is vibrated by a driver which is also not shown but may be similar to driver 62. Since the stepped mirror 42 has been omitted, a stepped glass block 106 is included instead to create the required displacement in the coherence functions associated with beams 48 and 50 and as illustrated in FIG. 4. The advantage of the arrangement shown in FIG. 8 is that the corner cubes are insensitive to alignment errors. FIG. 8 shows in broken lines an alternative position for detector D1 which might in practice be employed if there is not sufficient room for the detectors D1 and D2 to be positioned next to each other.

Figure 9:
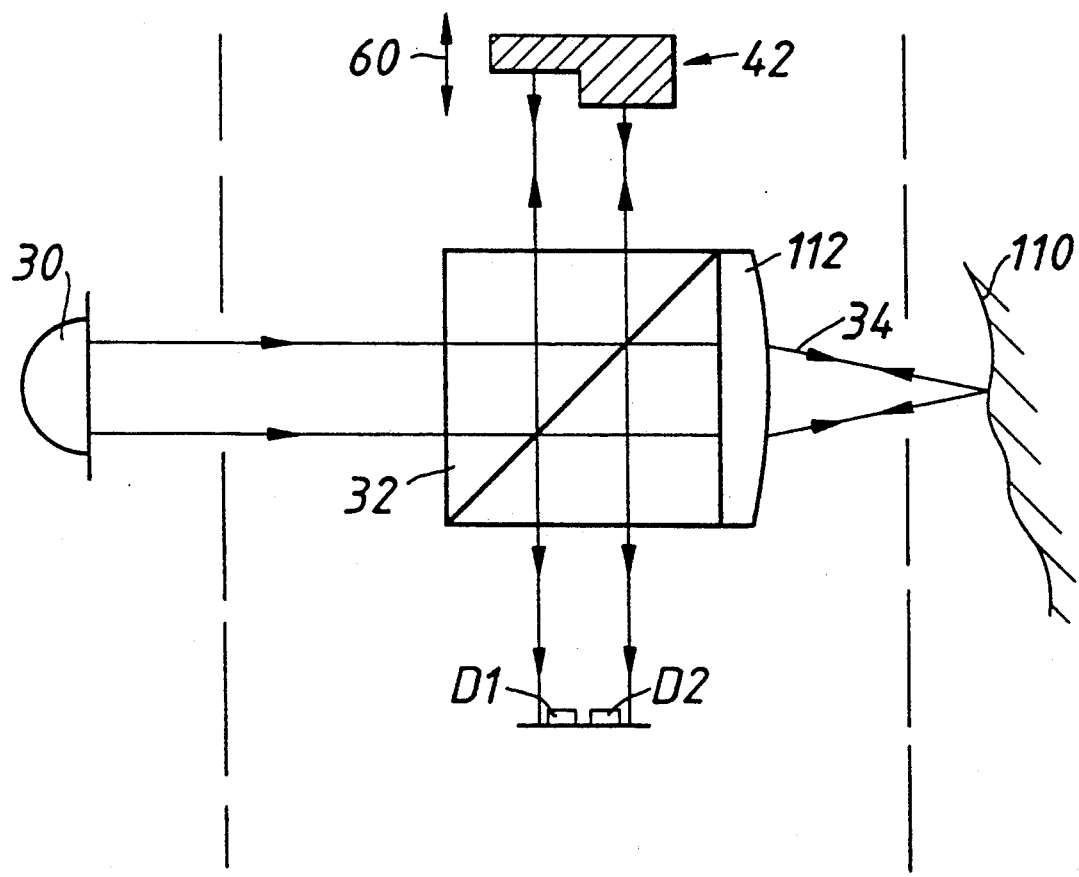
FIG. 9 illustrates diagrammatically an embodiment of the invention for measuring surface profiles.
Figure 12:
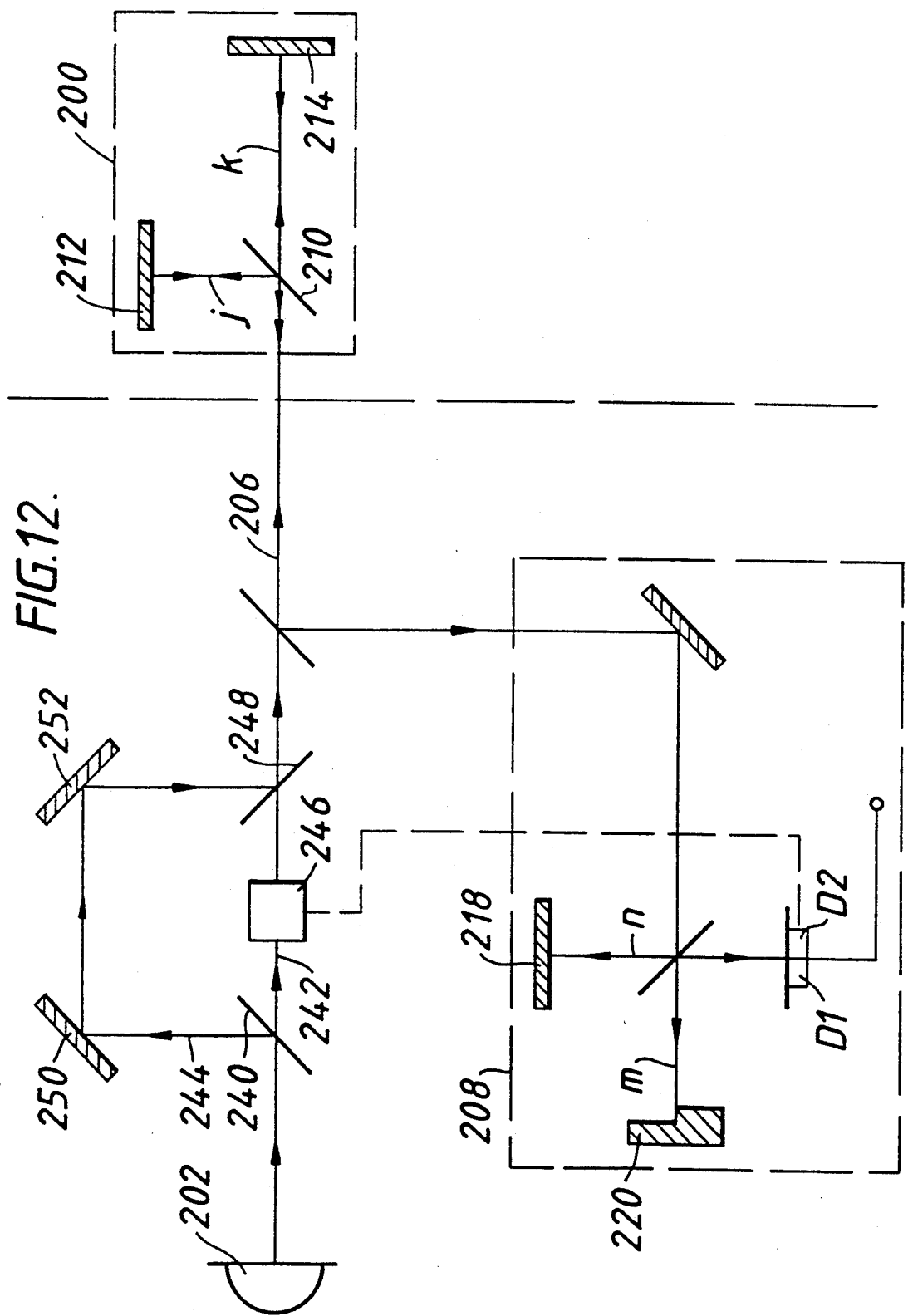
FIG. 12 is a diagrammatic representation of another embodiment.

The application of the invention to the measurement of surface profile is illustrated in FIG. 9. The embodiment is similar to FIG. 3 except that mirror 38 is omitted and its function in the operation of the apparatus is performed by a surface 110 whose profile is to be measured. Accordingly, the surface 110 must be reflective. A lens 112 is attached to the beam splitter 32 for focussing the beam 34 on the surface 110 and for collimating the light reflected back from that surface. Apart from these points, the FIG. 12 embodiment is identical to that in FIG. 3 (although not all parts are shown in FIG. 12) and signal processing may be as described with reference to FIGS. 3 to 7. Of course, to measure surface profile, relative movement between the surface 110 and the device of the invention is effected, which movement should be slow relative to the speed of oscillation of the mirror 42.

Where non-reflective surface profiles are to be measured, this may be achieved by the arrangement shown in FIG. 3, in which case the sensor 40 may comprise a stylus which is drawn across the surface whose profile is to be measured and whose movement causes movement of the mirror 38 in accordance with surface profile. Also, the arrangement shown in FIG. 3 might be used to measure pressure by coupling the movable mirror 38 to a pressure responsive diaphragm, for example.

Figure 10:
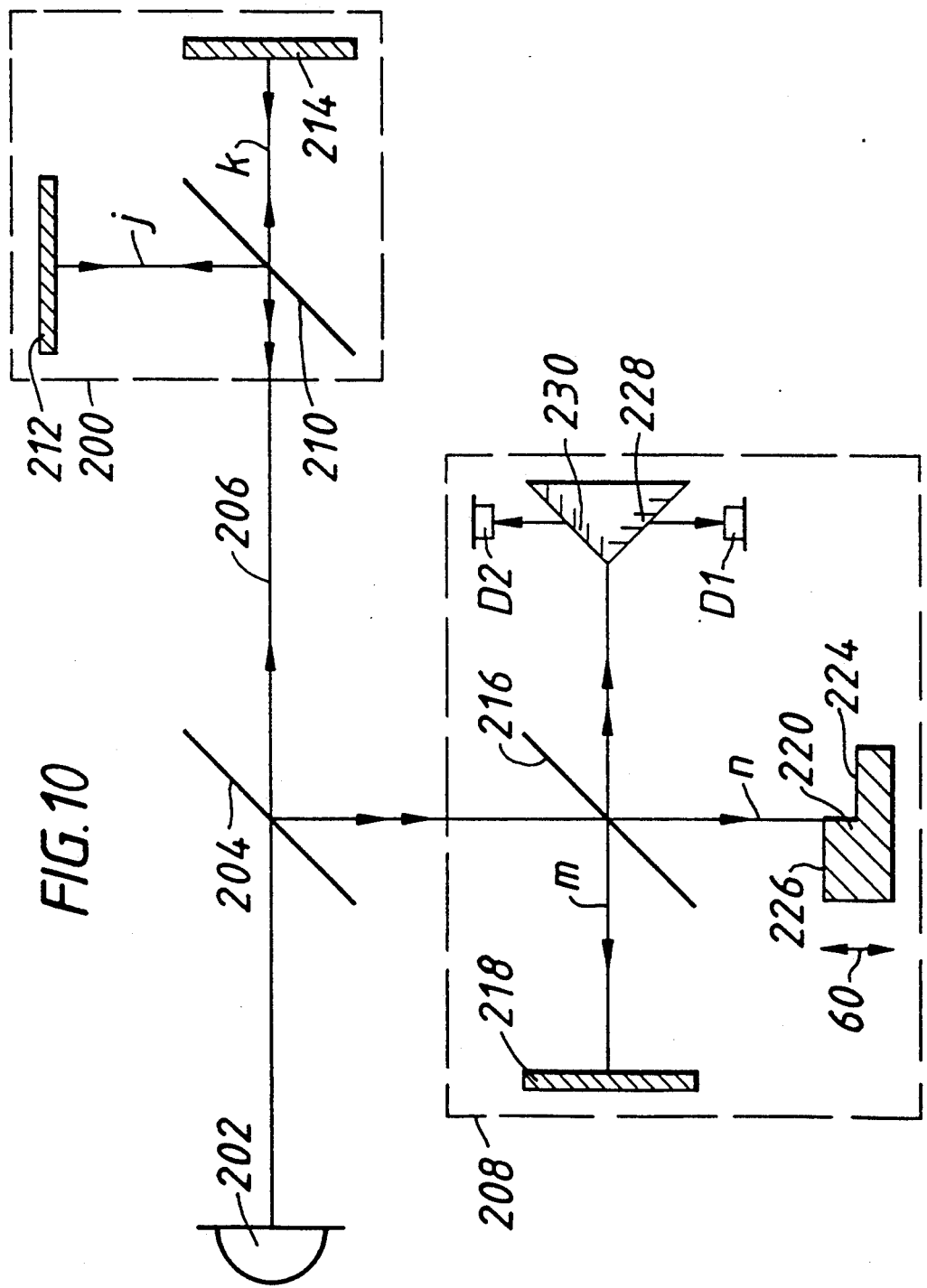
FIG. 10 is a diagrammatic representation of a further embodiment.

In the embodiment of FIG. 10, a remote sensing head 200 of rugged construction is provided and receives light from a short coherence source 202 through a semi-reflective mirror 204 and an optical fibre link 206. After reflection in the sensing head 200, light is returned through the optical fibre link 206 to the mirror 204 and reflected into a tracking interferometer 208 whose construction is similar, but not identical, to the interferometer shown in FIG. 3 and is, therefore, in accordance with the present invention. The purpose of the arrangement shown in FIG. 10 is to separate the sensing head from the tracking interferometer and to provide a sensing head which does not contain any active optical or electronic components but contains only passive optical elements which ma accordingly be highly resistant to hostile environments.

The sensing head 200 comprises a beam splitter 210, a fixed reference mirror 212 and a movable mirror 214 the position of which changes in response to the measurand. The optical path lengths between beam splitter 210 and the mirrors 212 and 214 are respectively indicated as j and k and the difference between these two path lengths is arranged to be substantially greater than the coherence length of source 202. As a result of this, when the light reflected by the two mirrors 212 and 214 is recombined in the beam splitter 210 interference fringes will not be apparent in the combined beam supplied back to the optical fibre link 206.

The tracking interferometer 208 comprises a beam splitter 216, a fixed mirror 218, a stepped mirror 220 and detectors D1 and D2 which respectively receive light reflected from the surfaces 224 and 226 of the stepped mirror 220 after recombination with the beam reflected from mirror 218 and after reflection from mirrors 228 and 230. Mirror 60 is oscillated by a driver (not shown but similar to driver 62 of FIG. 3) in the direction of double-headed arrow 60, the amplitude of oscillations being similar to the amplitude of the oscillations of mirror 42 in FIG. 3.

Figure 13:
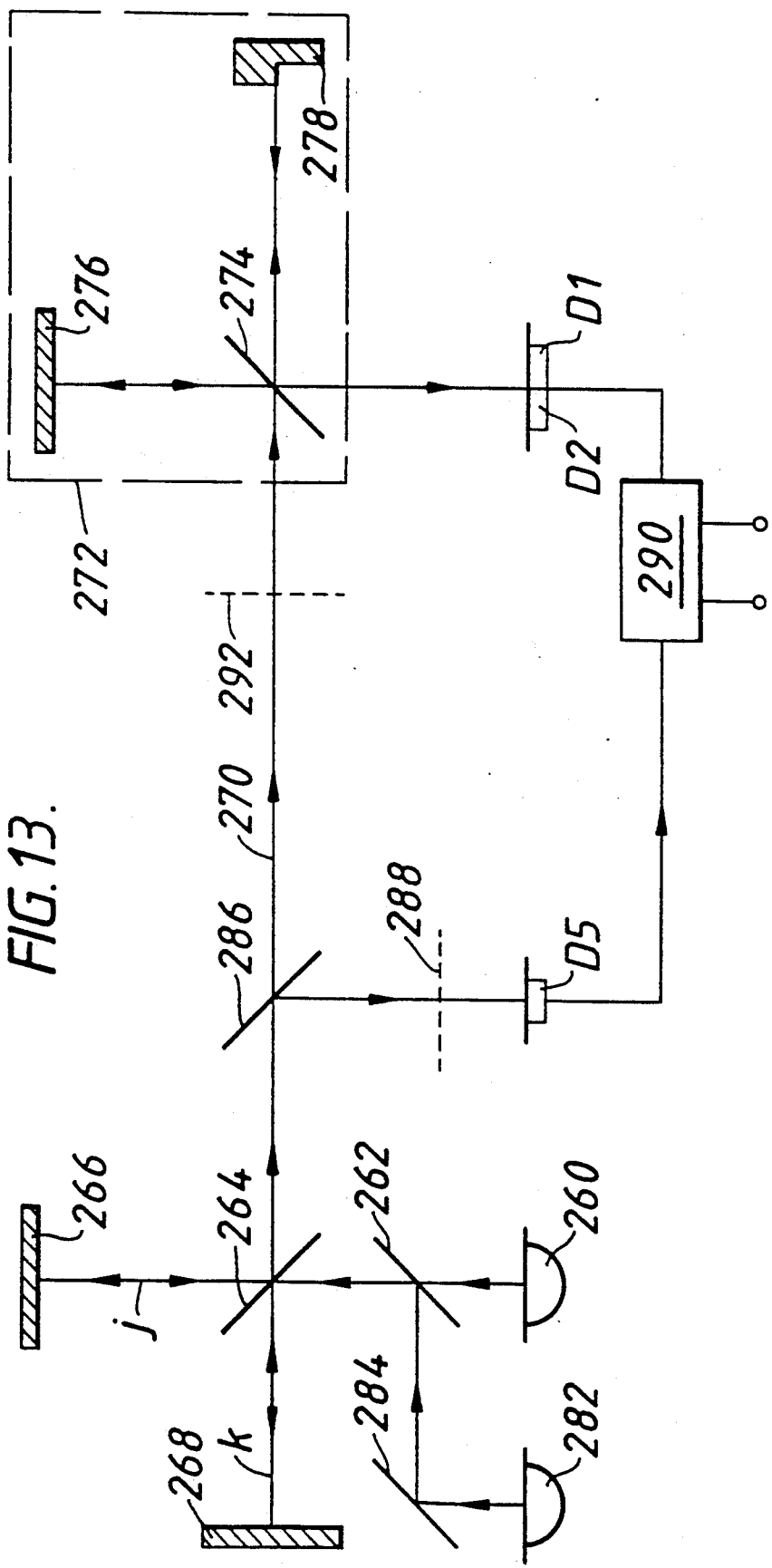
FIG. 13 is a diagrammatic representation of yet a further embodiment.

The optical path length between beam splitter 216 and mirrors 220 and 218 is designated in FIG. 13 respectively as n and m. These distances are chosen to satisfy the following relationships:

$$|2(k+m)-2(j+n)| < L$$

$$|2(k+n)-2(j+m)| > L$$

In the above expressions, L has the meaning indicated in FIG. 2 and may be termed the coherence length.

Provided these relationships exists and provided, as already described, that the difference between j and k is substantially greater than the coherence length of source 202, detectors D1 and D2 will produce output signals as described with reference to FIGS. 3 to 5 as the mirror 220 is oscillated in the same manner as mirror 42 and the signals thereby produced can be processed as described with reference to FIG. 6 or 7 to provide an indication of the position of mirror 214 within its range of movement and therefore to provide an indication of the magnitude of the parameter being measured.

Although link 206 has been described as an optical fibre link in FIG. 10, this could be omitted and instead light could be transmitted between mirror 204 and sensing head 200 through free space.

Figure 11:
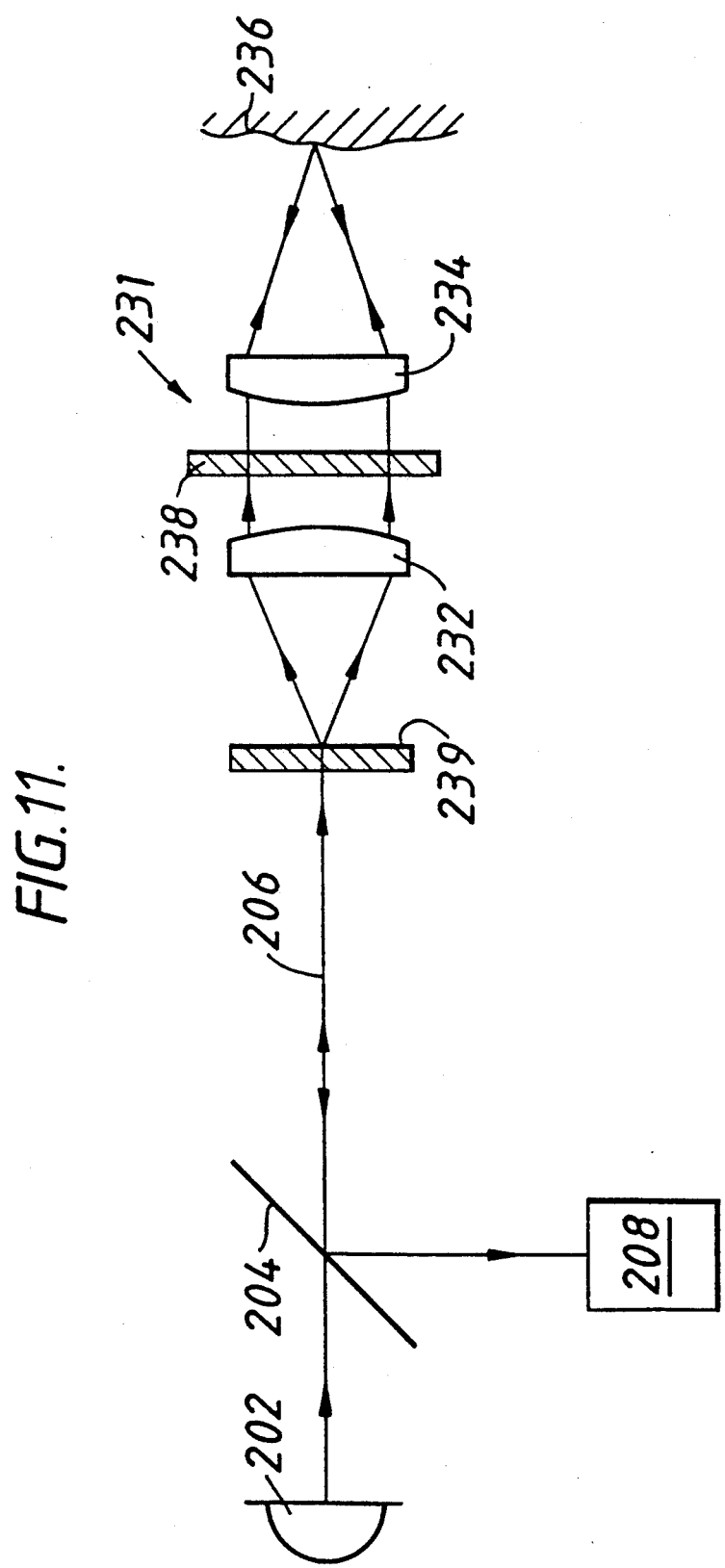
FIG. 11 illustrates a modification to the embodiment of FIG. 10.
Figure 14:
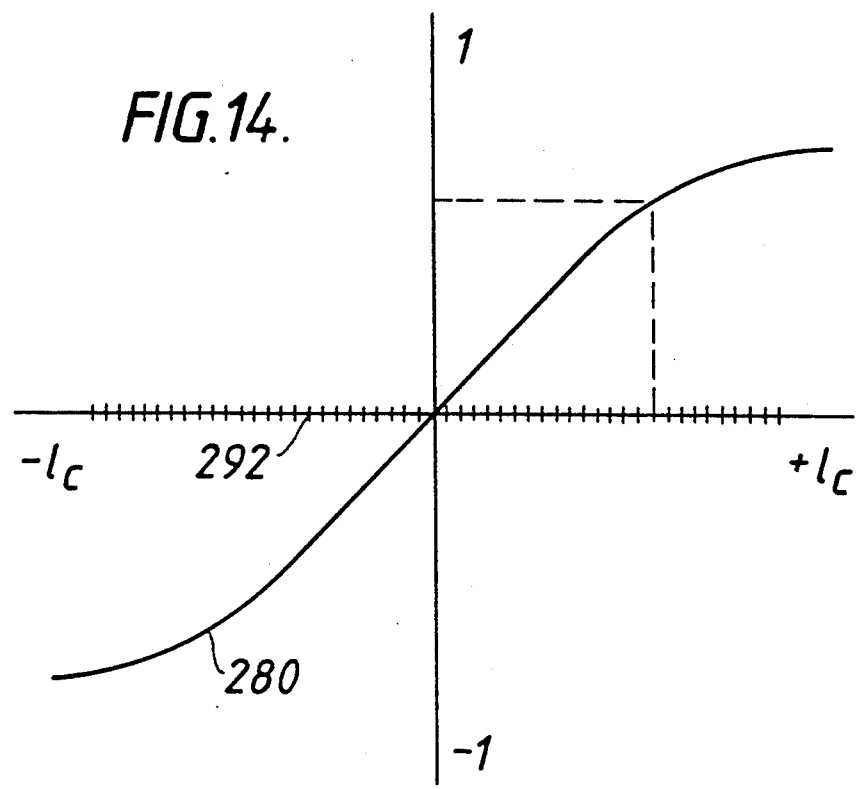
FIG. 14 is a curve for illustrating the operation of the embodiment of FIG. 16.

FIG. 11 shows a modification to the embodiment of FIG. 10 for surface profile measurement. In FIG. 14, the sensing head 200 is replaced by a sensing head 231 which comprises a collimating lens 232, a focussing lens 234 for focussing light received from the lens 232 onto a surface 236 whose profile is to be measured and the semi-reflective surface 238 between the lenses 232 and 234 which serves the function of both the beam splitter 210 and the reference surface 212. Alternatively, one could use the reflection from the end facet of the fibre if a fibre link is used. Reference number 239 in FIG. 11 indicates diagrammatically such an end facet. Thus, the light reflected back to the optical fibre link 206 is a combination of light reflected from the surface 238 (or 239) and the light reflected from the surface 236 and the distance between these two surfaces has to be substantially greater than the coherence length of source 202.

In the embodiment of FIG. 12, the light from the short coherence source 202 is split at a beam splitter 240 to form two beams 242 and 244. Beam 242 passes through a phase modulator 246 and is recombined with beam 244 at a beam combiner 248, beam 244 having been passed to the combiner 248 by reflection at mirrors 250 and 252. In this embodiment, the sensing head 200 is as described with reference to FIG. 13 but the tracking interferometer 208 is modified in that both mirrors 218 and 220 are fixed and the phase modulator 246 is utilised instead of oscillating the mirror 220. Thus, the frequency and amplitude of the phase modulation produced by modulator 246 may be equivalent to the frequency and amplitude of oscillation of mirror 220.

In the embodiment described with reference to FIG. 12, elements 240, 246, 248, 250 and 252 may all be formed as a single integrated optical device.

In the embodiment shown in FIG. 13 light from a short coherence length source 260 is transmitted through a beam combiner 262 to a beam splitter 264 to a fixed mirror 266 and a further mirror 268 movable in response to a measurand, these mirrors being spaced from the beam splitter 264 by the distances j and k whose difference, as previously described, is substantially greater than the coherence length of source 260. The recombined beams reflected from mirrors 266 and 268 are transmitted, for example through an optical fibre link 270 to an interferometer 272 comprising a further beam splitter 274, a mirror 276 and a stepped mirror 278 The beams reflected from the mirrors 276 and 278 are recombined at beam splitter 274 and directed to detectors D1 and D2 which respectively receive light from the two stepped surfaces of mirror 278, as in the case of previous embodiments. One of the mirrors 276 and 278 is oscillated in the same manner as mirror 42 in FIG. 3 so that detectors D1 and D2 produce signals as described with reference to FIGS. 3 to 5. Simplified signal processing is utilised however. In this processing, the two signals output from the detectors D1 and D2 are each averaged over a period of time and then the difference between the resulting averaged signals is divided by the sum thereof so that as the measurand varies the result of this computation is a curve as illustrated at 280 in FIG. 14. It can be seen that this is non-linear and, without calibration, cannot accurately represent the displacement of the mirror 268 in absolute units of length.

To provide such calibration, a monochromatic light source 282 is included with a wavelength substantially different from that of light source 260. Light from the source 282 is directed to beam splitter 264 via mirror 284 and beam combiner 262. The light from source 282 is split at beam splitter 264 and reflected from the two mirrors 266 and 268. As mirror 268 moves in accordance with variation in the parameter being measured, uniform fringes are produced in the light from source 282, preferably a wavelength standard source, upon recombination at beam splitter 264. With the aid of a beam splitter 286 and a filter 288, the fringes produced by source 282 are detected in a detector D5 which thereby provides a calibration signal to measuring circuit 290, the calibration signal being indicated at 292 in FIG. 10. Since the calibration signal 292 is a series of pulses at constant wavelength intervals, it provides a linear scale against which curve 280 may be calibrated.

A filter 292 prevents light from the source 282 passing to the beam splitter 274 but does not prevent the light from source 260 passing thereto.

Figure 15:
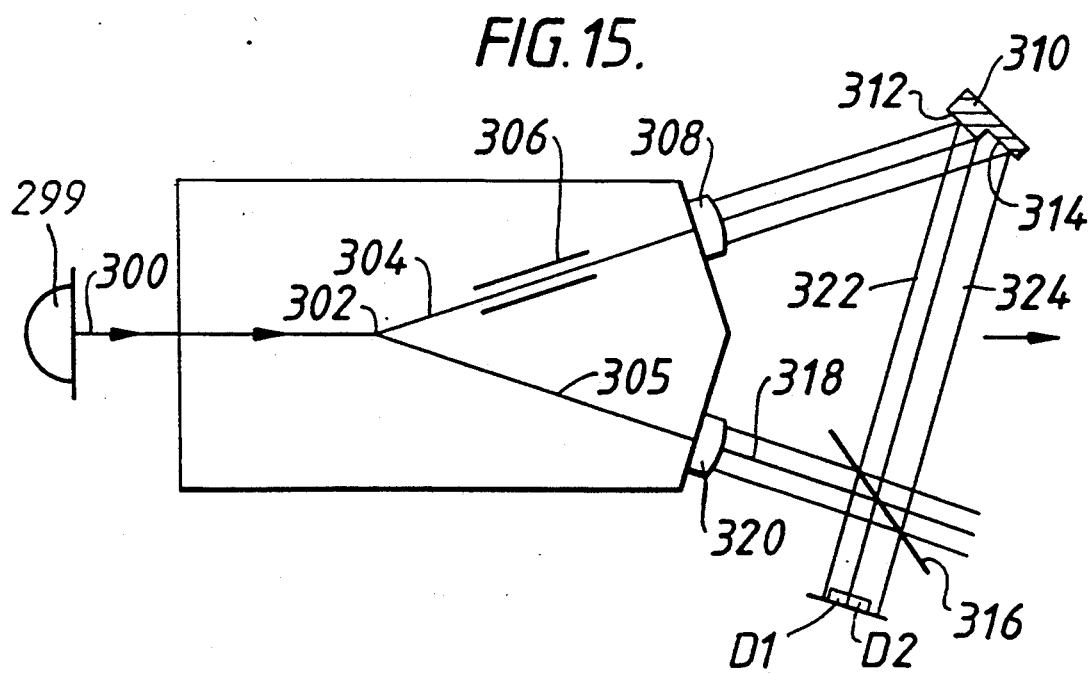
FIG. 15 is a diagrammatic representation of another embodiment.

FIG. 15 illustrates how the invention may be put into practice utilising integrated optical components. Light from a short coherence length source 299 is supplied to a waveguide 300 which divides at point 302 into first and second branches 304 and 305. Branch 304 includes a phase modulator 306 which is utilised as a sensor and introduces a phase modulation representing the parameter being measured. An example of such a parameter is temperature. In addition, a phase oscillation is applied in the phase modulator to serve the same purpose as oscillation of the mirror 42 of FIG. 3. After passing through the phase modulator 306, the light in branch 304 is directed via a lens 308 to a stepped mirror 310 having faces 312 and 314. A beam combiner 316 receives a beam 318 from branch 306 via a lens 320 and combines the beam 318 with two partial beams 322 and 324 from the respective surfaces 312 and 314 of mirror 310. Detectors D1 and D2 are arranged to receive the combination of the respective partial beams 322 and 324 with the beam 318. This arrangement produces signals as described with reference to FIGS. 3 to 5 and accordingly signal processing of the outputs of the detectors D1 and D2 may be as described with reference to FIGS. 6 and 7.

FIG. 15 may be modified and could be utilised simply as the tracking interferometer 208 in an arrangement as shown in FIG. 13. In this case, the light received in the waveguide 300 would have come from the passive measuring head 200 and the phase modulator 306 would simply serve the function of the oscillation applied to mirror 42 in FIG. 3.

A variety of passive measuring heads is shown in FIGS. 16 to 22 and each of these may be used in place of the measuring head 200 shown in FIG. 10.

Figure 16:
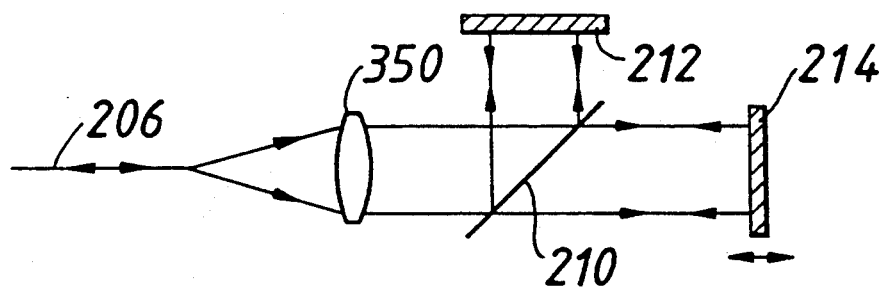

In FIG. 16 light from fibre 206 is directed through a collimating lens 350 to beam splitter 210, reference mirror 212 and movable mirror (measurand) 214. Otherwise, this embodiment would be the same as FIG. 13.

Figure 17:
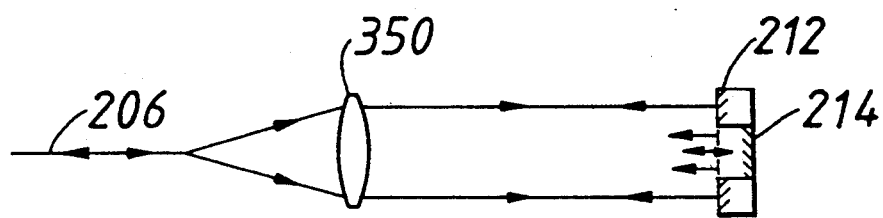

In FIG. 17, the reference mirror 212 is annular and the movable mirror 214 is a diaphragm located in the central opening thereof.

Figure 18:
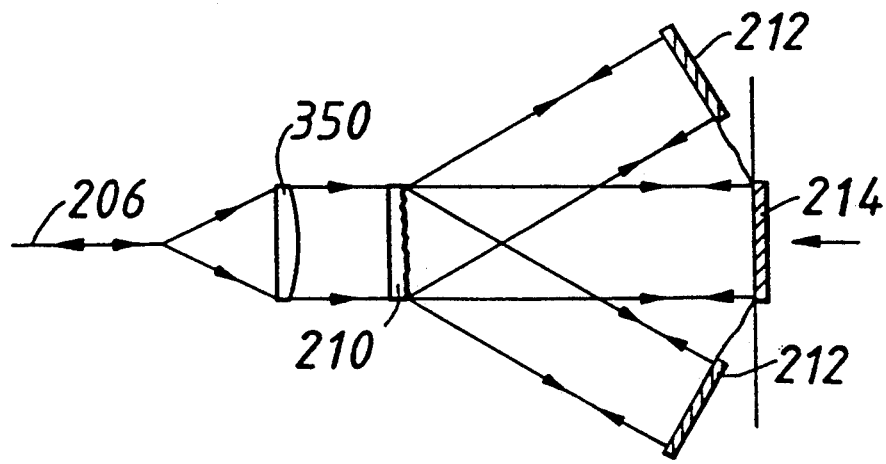

In FIG. 18 the beam splitter 210 is in the form of an optical grating and the reference mirror 212 is again annular and located at a appropriate angle relative to the grating 210.

Figure 19:
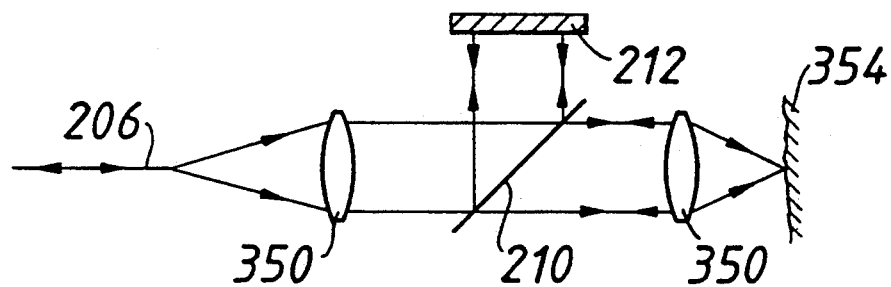

In FIG. 19 the arrangement is similar to FIG. 16 but a lens 352 is included for focussing light onto a surface 354 whose profile is to be measured, surface 354 replacing the movable mirror 214.

Figure 20:
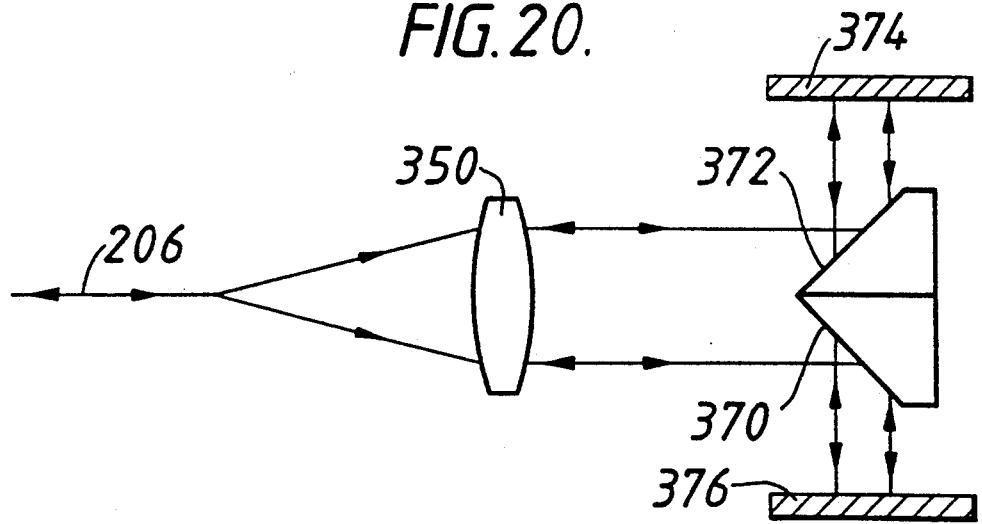

In FIG. 20, light from the lens 350 is directed at two mirrors 370 and 372 and then returned from mirrors 374 and 376. In this arrangement, the measurand may be the difference between two pressures, mirror 374 being arranged to move towards and away from mirror 372 in response to one of the pressures and mirror 376 being arranged to move towards and away from mirror 370 in response to the other pressure.

FIG. 21 shows a further form of sensing head which is for measuring surface characteristics, particularly surface roughness. The light output from the fibre link 230 is directed to a surface 600 whose roughness is to be measured via a composite lens 602 comprising an inner lens 604 and an annular lens 606 which surrounds the lens 604. The length Y of the lens 604 and its refractive index relative to the length and refractive index of lens 606 are such as to introduce a phase delay between the light rays 608 which pass through lens 604 (in both directions) between the fibre 230 and the surface 600 and the rays 610 which pass in both directions through the annular lens 606. This phase difference is chosen to satisfy the constraints placed upon dimensions j and k as discussed in connection with FIG. 10. The rays 610 are substantially focussed on the surface 600 but the rays 608 are out of focus at the surface 600. Thus, the light reflected back through lens 604 will behave as if reflected from a surface positioned at the mean of the roughness variations in surface 600. As a result, the relative path length variations detected after processing the signals from detectors D1 and D2 in interferometer 208 of FIG. 10 when the head shown in FIG. 21 is used will represent height variations in the surface.

The sensing head shown in FIG. 22 comprises an optical fibre 700 provided with a semi-reflective surface 702 on its end, a further fibre or block 704 attached to the semi-reflective surface 702 and a sensing element 706 which is of light transmissive material and is attached to the end of portion 704. A reflective surface 708 is provided on the end of element 706. For sensing parameters such as temperature and/or pressure, the element 706 is constructed of a material whose light transmissive properties vary in response to such parameter or parameters. For example, refractive index might change. An example of a material which might be used for the element 706 is perspex. The distance Z between surfaces 702 and 708 is chosen to satisfy the difference between dimensions j and k explained with reference to FIG. 10 and variations in the optical path length through element 706 arising from variations in the parameter to be measured are accordingly detected by processing of the signals from the detectors D1 and D2 as previously described with reference to FIG. 10. The sensing head shown in FIG. 22 is particularly advantageous where measurements are to be taken in small spaces, such as within the human body in the medical field, and/or where a disposable sensing head is required.

Figure 23:
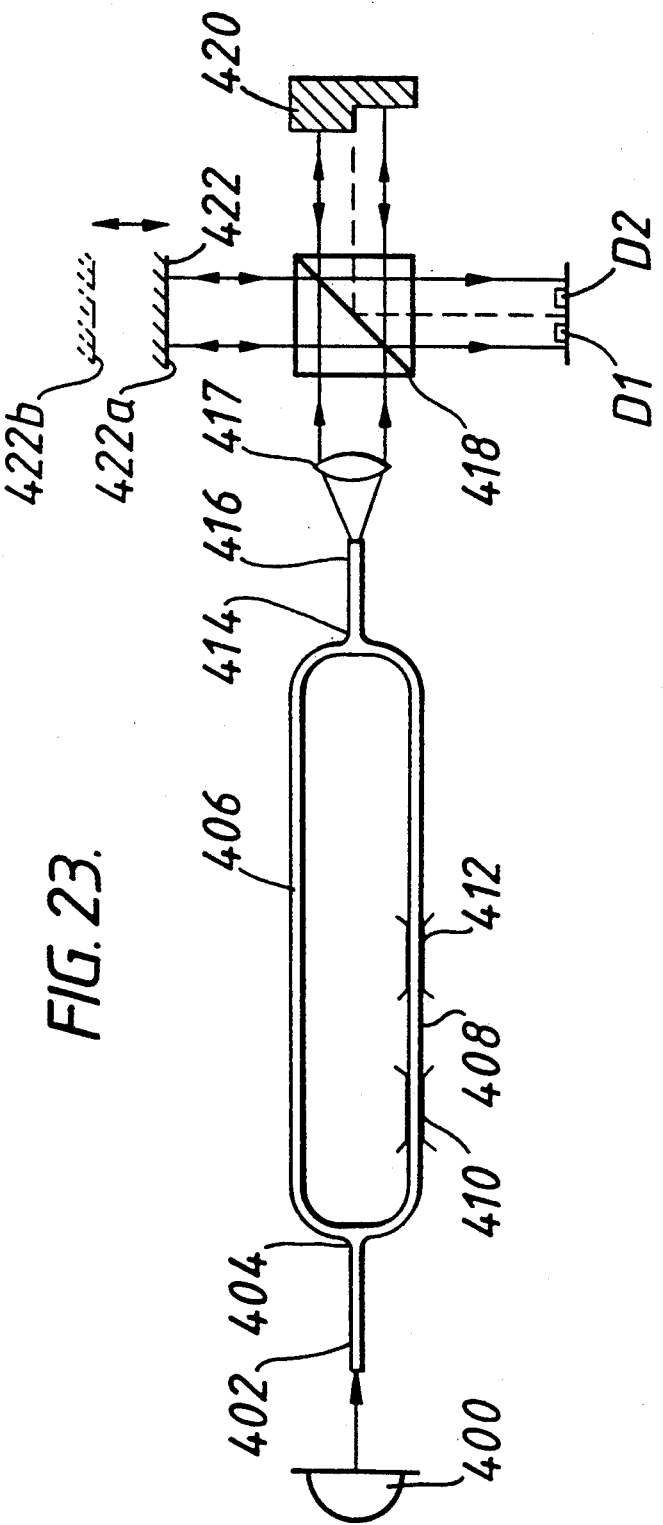
FIG. 23 is a diagrammatic representation of yet a further embodiment.

FIG. 23 is a diagrammatic illustration of a distributed sensing system in accordance with the invention. Light from a short coherence length source 400 is supplied to the input end of an optical fibre 402 which is divided at 404 into two to provide a reference fibre 406 and a measuring fibre 408 for measuring, for example, temperature or strain at a plurality of physically separated locations two of which are designated by the reference numbers 410 and 412. The reference fibre 406 and measuring fibre 408 must have different refractive indices $n_r$, $n_m$. Hence after propagation a distance $l_f$ in each fibre, the optical path lengths in the two fibres are as follows:

reference fibre $l_r = n_r l_f$ measurment fibre $l_m = n_m l_f$ $$l_r - l_m = l_f(n_r - n_m)$$

the beams become incoherent when $$|l_r - l_m| > L$$

L is the source coherence length.

When the difference between $n_r$ and $n_m$ is small, it will be seen from the above equations that $L_f$ becomes large. Under these conditions, the coherence length L maps into significantly larger lengths of distributed sensing medium. This enables discrete sections of the medium to be sensed by the movement through relatively short distances of a tracking mirror in a sensing interferometer as will be more fully described Thus, at the locations 410 and 412, the fibre 408 would be exposed to the parameter to be measured but otherwise fibres 408 and 406 would be insulated from the effects of parameters which would cause phase modulation of the light travelling along the fibres. At 414, the fibres are joined and the combined light from fibres 406 and 408 exiting from output end 416 is directed via a lens 417 at a beam splitter 418, from which it is directed to detectors D1 and D2 after reflection at a stepped mirror 420 and a further mirror 422. The mirror 420 is oscillated by a driver (not shown) in the same manner as mirror 42 of FIG. 3. Mirror 422 is movable between a number of positions at different distances from beam splitter 418, only two of which positions are indicated in FIG. 21 and designated respectively by reference numbers 422a and 422b. Position 422a is selected, together with the other dimensions of the system, so that the interference arising from combination at point 414 of the light from the fibres 406 and 408 and from the combination of the various beams in beam splitter 418 after reflection at mirrors 420 and 422 enables the detectors D1 and D2 to produce signals as described with reference to FIGS. 4 and 5 to provide a measure of phase variations arising from changes in the sensed parameter at point 410 in fibre 408. The second position 422b of mirror 422 provides for measurement of the parameter at point 412 in fibre 408. For these conditions to arise, the phase difference between the light arriving at junction 414 from fibre 406 and that arriving at junction 414 from fibre 408 must be substantially greater than the coherence length of the source and in this connection, this phase difference is the equivalent of the above described difference between dimensions j and k described with reference to FIG. 10. Further, to avoid cross-talk between measurement at point 410 and that at point 412, the points at which measurement is taken along the fibre 408 should be spaced from each other by a distance at least several times the coherence length of the source, for example six times the distance L indicated in FIGS. 1 and 2.

Only two points 410 and 412 have been described, it should be understood that a greater number of such points may be provided, in which case the mirror 422 would have an equivalent number of positions each spaced a different distance from the beam splitter 418. In order to monitor the parameters at these different positions along the fibre 408, the mirror 422 may be continuously scanned through its various positions. Further, instead of oscillating the mirror 420, such oscillation could be replaced by an oscillation of the mirror 422, which oscillation would be superimposed on the scanning movement of mirror 422 above referred to where such takes place.

The arrangement described with reference to FIG. 23 may be modified in a variety of ways. For example, the reference fibre 406 could be dispensed with and, instead, the light from source 400 could be polarised in two directions and the fibre 408 arranged to introduce different propagation delays for the two planes of polarisation. Commercially available birefringent fibre will satisfy these conditions. Means would be provided at the output of the fibre for changing the relative polarisation of the two beams so that they may interfere.

As will be apparent from the above description, the invention may be put into practice in a number of different ways. For example, although in FIG. 3, the mirror 42 has been oscillated to introduce a phase modulation and the mirror 38 has been movable in accordance with the parameter being measured, it would alternatively be possible to use the mirror 42 as the measurand the mirror 38 for phase modulation. As a further alternative, one of these mirrors could be fixed and the other could be used both as the measurand and oscillated to provide the required phase modulation. As a further alternative, the phase modulation could be achieved by positioning a phase modulator in the path of beam 36 or beam 34 instead of oscillating the mirror 42.

Although a number of signal processing schemes have been described, other signal processing techniques are possible to extract the required information from the signals produced by the detectors.

Laser diodes which produce light of short coherence length are commercially available. The wavelength of the light from such diodes can be modulated by varying their drive current. The result of such modulation would give an effect equivalent to the oscillation of the stepped mirror previously described, thus eliminating the need for physical movement of an element to achieve this effect.

As an example of a further modification, although the distributed sensor system illustrated in FIG. 21 has been shown to comprise optical fibres and the fibre 406 has been described as having a length different from that of the fibre 408 to provide the required phase differences in the light passed thereby, it would alternatively be possible and probably preferable to make the fibres 406 and 408 of materials of different refractive index to achieve the same effect. It would also be possible to provide within the scope of the invention a distributed sensor operating on the principles described with reference to FIG. 21 but utilising optical components other than optical fibres. For example, the junctions 404 and 414 could be replaced by a conventional beam splitter and beam combiner and the fibre 406 could be omitted or replaced with other components such as a solid block of material of appropriate refractive index or other means defining an optical path of appropriate optical length. Similarly, means other than the fibre 408 could be provided for transmitting the light between the various distributed measuring points. The transducers provided at such measuring points may be of any suitable form and construction, the requirement being that they should introduce a phase change as a function of the measurand.

The shape of the curve 20 shown in FIG. 2 is dependent upon the bandwidth of the light source. The narrower the bandwidth, the less steep the curve and the greater the distance L over which fringes can be observed. However, as bandwidth is narrowed, a point will come at which the difference in contrast between adjacent fringes will not be detectable and resolution will then be impaired because it will not be possible to resolve to one wavelength or less. However, the range over which measurements may be made will be increased. Accordingly, in practice, the coherence length of the light source will be selected dependent upon the range and resolution required.

Although in the foregoing embodiments, the contrast between adjacent fringes has been measured, it is possible for other parameters of the fringes to be detected in accordance with the invention. For example, with appropriate modifications in circuitry, the brightness of the bright fringes might be detected since this varies with the parameter being measured and the resulting signals used to provide an indication of the parameter. Of course, where a light source whose brightness is not constant were used, steps may need to be taken to compensate for any such variations in brightness. Further, although in the embodiments described, the relatively linear portions of the curve 20 shown in FIG. 2 have been employed, modifications may be made to utilise other portions of the curve.

The invention may have wide application and accordingly the measurand may be any physical variable which can be sensed in a manner which produces the optical variations as described in the foregoing.

Where any of the elements, such as the light source, are sensitive to temperature variations, means may be provided for compensating for such variations in a conventional manner.

We claim:

1. A measuring device comprising a short coherence length light source, interferometer means arranged to receive light from said source and to produce a sequential series of interference fringes in which the contrast between bright and dark fringes varies along the series, means for detecting said fringes and for providing a signal which is derived from different fringes in said series for different values of a measurand and whose signal-value varies as a function of the brightness of the fringes from which said signal is derived, and means for identifying from said signal-value the identity of the fringes from which said signal is derived and for providing, on the basis of said identity, an indication of the value of said measurand.

2. A device according to claim 1, wherein said detecting and signal providing means is operable, in a measuring operation, to derive said signal from a plurality of successive fringes in said series, and including means for deriving from said signal-value a further value which is a function of the contrast between bright and dark fringes in said plurality, said identifying means being responsive to said further value for identifying the fringes from which said signal is derived.

3. A device according to claim 2, wherein said interferometer means is arranged to produce the fringes of said series in turn as the measurand varies, and including means for causing said plurality of successive fringes to be produced in turn in said measuring operation.

4. A device according to claim 3, wherein said causing means is operable for introducing a phase modulation in light in said interferometer means in said measuring operation to cause production of said plurality of successive fringes.

5. A device according to claim 4, wherein said causing means comprises means for changing the path length in an arm of said interferometer means for introducing said phase modulation.

6. A device according to claim 5, wherein said causing means comprises a mirror and means for oscillating said mirror to produce said phase modulation.

7. A device according to claim 3, wherein said light source is controllable to vary the wavelength of light produced thereby and said causing means is operable for controlling said light source to modulate said wavelength to cause production of said plurality of successive fringes.

8. A device according to claim 3, wherein said causing means is operable to produce said plurality of successive fringes cyclically.

9. A device according to claim 8, including means to produce an indication of said measurand to a resolution of less than one wavelength by a process which utilises the phase relationship between a first alternating signal derived from said detecting means and representing the intensity of the light in said plurality of fringes as they are cyclically produced and a second alternating signal representing the phase of the cyclical production of said plurality of fringes.

10. A device according to claim 9, wherein said signal producing means utilises the value of said first alternating signal at at least one predetermined point in said cycle of production of said plurality of fringes for the determination of said phase relationship.

11. A device according to claim 10, wherein said at least one point is a maximum or minimum point in said second alternating signal.

12. A device according to claim 11, wherein said producing means is operable to utilise the value of said second alternating signal at both a maximum point and a minimum point in said phase modulation.

13. A device according to claim 1, wherein the bandwidth of said light source is such that changes in the contrast of successive fringes in said series is substantially undetectable by said detecting means, said device thereby providing for measurement to a resolution of less than one wavelength over a relatively long range.

14. A device according to claim 1, operable for measuring surface profile, said interferometer means being arranged to be capable of supplying light to a surface whose profile is to be measured and receiving reflected light back from said surface, said profile constituting said measurand.

15. Apparatus according to claim 1, wherein said interferometer means comprises a first interferometer adapted to form a measuring head and having first and second arms whose optical path lengths are substantially different from the coherence length of said source, and a second interferometer optically coupled to said first interferometer and arranged to produce said fringes from light received from said first interferometer.

16. A device according to claim 1, wherein said interferometer means comprise a first interferometer which includes a plurality of transducers distributed at different spaced apart measuring points and a second interferometer for receiving light from said first interferometer, said detecting means being arranged to receive light from said second interferometer and said second interferometer including an element which may be adjusted to enable selection of the transducer which will be effective in the production of said series of fringes.

17. A device according to claim 15, wherein said adjustable element is a movable mirror.

18. A device according to claim 1, constructed at least partly as an integrated optical unit.

19. A device according to claim 1, comprising a light source whose wavelength provides a measuring standard, and means for calibrating the device using said measuring standard.

20. A device according to claim 1 arranged so that said contrast of said fringes caries substantially linearly over said measuring range.

21. A measuring device comprising a short coherence length light source, interferometer means arranged to receive light from said source and to produce a first and second sequential series of interference fringes in which the contrast between bright and dark fringes varies along each of the series, the contrast in said first series varying in the opposite sequential sense to that in said second series, first means for detecting said fringes of said first series and for providing a first signal having a first value which is derived from different fringes in said first series for different values of a measurand and whose first value varies as a function of the brightness of the fringes from which said first signal is derived, second means for detecting said fringes in said second series and for providing a second signal having a second value which is derived from different fringes in said second series for different values of said measurand and whose second value varies as a function of the brightness of the fringes from which said second signal is derived, and means for identifying from said first and second values of said first and second signals the identity of the fringes from which said first and second signals are derived and for providing, on the basis of said identity, an indication of the value of said measurand.

22. A device according to claim 21, wherein said first and second detecting and signal providing means are operable, in a measuring operation, to derive said first and second signals respectively from a plurality of successive fringes in said respective first and second series, and including means for deriving from said first value a first further value which is a function of the contrast between bright and dark fringes in said plurality thereof of said first series, means for deriving from said second value a second further value which is a function of the contrast between bright and dark fringes in said plurality thereof in said second series, said deriving means being operable to normalise said further values, and said identifying means being responsive to said normalised further values for identifying the fringes from which said first and second signals are derived.

23. A device according to claim 22, wherein said deriving means is operable to produce a set of signals representing a set of numbers for identifying the fringes from which said first and second signals are derived.

24. A device according to claim 23, wherein, if H1 to Hn represent said set of number, F1 to Fn represent the normalised contrast in said plurality of fringes from one said series and G1 to Gn represent the normalised contrasts of said plurality of fringes from said other series, then said numbers are derived as follows;

$$H1 = F1/G1$$
$$H2 = F2/G2$$
$$H3 = F3/G3$$
$$\ldots$$
$$Hn = Fn/Gn.$$

25. A device according to claim 23, wherein, if H'1 to H'n represent said set of numbers, F1 to Fn represent the normalised contrast in said plurality of fringes from one said series and G1 to Gn represent the normalised contrasts of said plurality of fringes from said other series, then said numbers are derived as follows:

$$H'1 = (F1 - G1)/(F1 + G1)$$
$$H'2 = (F2 - G2)/(F2 + G2)$$
$$\ldots$$
$$H'n = (Fn - Gn)/(Fn + Gn).$$

26. A measuring device comprising a short coherence length light source, interferometer means arranged to receive light from said source and to produce a first and a second series of interference fringes, whose contrast between adjacent bright and dark fringes varies over a measuring range as a function of a measurand, said contrast in one of said series varying with said measurand in the sense opposite to said contrast in the other said series, means for detecting said fringes, and means for deriving from said detecting means a signal which is a function of the value of said contrast in each said series within said measuring range and is thereby indicative of the value to be measured.

27. A device according to claim 26, including means for causing a plurality of adjacent said fringes in each of said series to be produced in a measuring operation, said deriving means being operable to derive said signal from a plurality of values of said contrast from said plurality of fringes in each said series.

28. A device according to claim 27, wherein said interferometer means includes an optical element having a step therein for providing first and second beams having a phase difference from each other, said first and second beams being respectively caused to interfere with a third beam for producing said first and second series of intereference fringes.

29. A device according to claim 28, wherein said optical element with a step therein comprises a mirror.

30. A device according to claim 28, wherein said optical element with a step therein comprises a light transmissive element.

* * * * *

UNITED STATES PATENT AND TRADEMARK OFFICE
CERTIFICATE OF CORRECTION

PATENT NO. : 5,301,010
DATED : April 5, 1994
INVENTOR(S) : Jones, et. al.

It is certified that error appears in the above-indentified patent and that said Letters Patent is hereby corrected as shown below:

Title page, item [22], PCT Filed, should read --Feb. 19, 1990--;

Column 7, delete line 24 and substitute therefor --Gn = (f'max - e'min)/(f'max + e'min)--;

Column 10, line 2, "ma" should read --may--;

Column 11, line 33, after "278" insert --.--;

Column 14, line 6, after "described" insert --.--;

Column 17, line 64, "caries" should read --varies--;

Column 18, line 44, "number" should read --numbers--.

Signed and Sealed this

Thirtieth Day of August, 1994

Attest:

BRUCE LEHMAN

Attesting Officer

Commissioner of Patents and Trademarks